United States Patent
Matsumoto

(10) Patent No.: US 10,545,031 B2
(45) Date of Patent: Jan. 28, 2020

(54) PORTABLE TERMINAL DEVICE, RECORDING MEDIUM, AND CORRECTION METHOD

(71) Applicant: MegaChips Corporation, Osaka-shi (JP)

(72) Inventor: Mahito Matsumoto, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 615 days.

(21) Appl. No.: 14/864,166

(22) Filed: Sep. 24, 2015

(65) Prior Publication Data

US 2016/0011004 A1 Jan. 14, 2016

Related U.S. Application Data

(63) Continuation of application No. PCT/JP2014/058466, filed on Mar. 26, 2014.

(30) Foreign Application Priority Data

Mar. 29, 2013 (JP) .................................. 2013-072311

(51) Int. Cl.
*G01C 25/00* (2006.01)
*G01C 22/00* (2006.01)

(52) U.S. Cl.
CPC ........... *G01C 25/00* (2013.01); *G01C 22/006* (2013.01)

(58) Field of Classification Search
CPC ...... G01C 22/006; G01C 25/00; G01C 21/16; H04M 2250/12; H04M 2250/52
USPC ..... 702/96, 141, 178, 189; 345/158; 700/91, 700/96

See application file for complete search history.

(56) References Cited

U.S. PATENT DOCUMENTS 5,699,256 A 12/1997 Shibuya et al.
8,532,675 B1 * 9/2013 Pasquero .......... H04M 1/72572
345/158

(Continued)

FOREIGN PATENT DOCUMENTS

JP 7-324941 12/1995
JP 2004-138513 5/2004

(Continued)

OTHER PUBLICATIONS

Zahariah, Camera-aided inertial navigation using epipolar points, 2010.*

(Continued)

*Primary Examiner* — Michael P Nghiem
*Assistant Examiner* — Dacthang P Ngo
(74) *Attorney, Agent, or Firm* — Xsensus LLP

(57) ABSTRACT

A portable terminal device provided with: a gyro sensor measuring an angular velocity to acquire angular velocity information; an acceleration sensor measuring an acceleration to acquire acceleration information; a camera capturing an image of a subject in surroundings to acquire image information; a vector calculation unit calculating a motion vector of the subject based on the image information; a correlation decision unit deciding a relative relation between a traveling direction by a walking motion of the user and an image-capturing direction of the camera in accordance with the angular velocity information and the acceleration information; a rectilinear walking decision unit deciding whether the user is in a rectilinear state in accordance with the calculated motion vector of the subject and correlation decision information; and a correction unit correcting the angular velocity information acquired by the gyro sensor in response to decision that the user is in the rectilinear state.

20 Claims, 16 Drawing Sheets

(56) References Cited

U.S. PATENT DOCUMENTS

| | | | | |
|---|---|---|---|---|
| 2008/0249732 A1* | 10/2008 | Lee | ............. | G01C 19/42 |
| | | | | 702/96 |
| 2010/0214216 A1* | 8/2010 | Nasiri | ............. | A63F 13/06 |
| | | | | 345/158 |
| 2011/0106487 A1 | 5/2011 | Kourogi | | |
| 2011/0178759 A1* | 7/2011 | Uchida | ............. | G01C 22/006 |
| | | | | 702/141 |
| 2012/0203453 A1* | 8/2012 | Lundquist | ............. | G01C 21/005 |
| | | | | 701/434 |
| 2014/0104445 A1* | 4/2014 | Ramachandran | ............. | G01C 25/00 |
| | | | | 348/208.2 |
| 2015/0105881 A1* | 4/2015 | Guerrero | ............. | A61B 5/11 |
| | | | | 700/91 |

FOREIGN PATENT DOCUMENTS

| | | | | |
|---|---|---|---|---|
| JP | 2008-275344 | 11/2008 | | |
| JP | 4897542 | 3/2012 | | |
| JP | 2012145457 | * 8/2012 | ............. | G01P 13/00 |
| JP | 5059933 | 10/2012 | | |
| JP | 5059933 B2 | 10/2012 | | |
| JP | 2013-117493 | 6/2013 | | |
| WO | WO 2010/001968 | 1/2010 | | |

OTHER PUBLICATIONS

JP 2012145457 English Translation.*
Office Action dated Aug. 2, 216 in Japanese Patent Application No. 2013-072311 (with English translation).
Combined Office Action and Search Report dated Mar. 2, 2017 in Chinese Patent Application No. 201480017606.4 with partial English translation and English translation of category of cited documents.
International Search Report dated May 20, 2014 in PCT/JP2014/058466 filed Mar. 23, 2014 (with English Translation).
International Preliminary Report of Patentability and Written Opinion dated Sep. 29, 2015 in PCT/JP2014/058466 (with English translation).

* cited by examiner

PORTABLE TERMINAL DEVICE, RECORDING MEDIUM, AND CORRECTION METHOD

TECHNICAL FIELD

The present invention relates to a technique for correcting (calibrating) a sensor that measures information on movement of an object of observation (especially, a pedestrian).

BACKGROUND ART

An application for guiding a pedestrian to a destination has been conventionally proposed. For accurately guiding the pedestrian to the destination, it is necessary to grasp the position of the pedestrian in real-time with high accuracy. As a positioning technique that measures the position of the pedestrian, a GPS (Global Positioning System) technique in which radio waves from a satellite are received with a terminal carried by the pedestrian is popular. However, because the terminal cannot receive the radio waves from the satellite indoors, for example, in a station building or an underground shopping mall, the positioning by the GPS cannot be used. Therefore, as a technique for achieving guidance of the pedestrian indoors, a relative positioning technique using a self-contained sensor such as an acceleration sensor, an angular velocity sensor, or a magnetic sensor, has been proposed. The relative positioning by means of the self-contained sensor is achieved, for example, by detecting the movement of the pedestrian by the self-contained sensor, estimating a travelling direction and a traveling velocity, and calculating a vector of the movement of the pedestrian.

However, the self-contained sensor (especially, a gyro sensor (angular velocity sensor)) has to be regularly calibrated because a bias noise is always changed by disturbance such as the temperature. Such techniques are described in Patent Literatures 1 to 4, for example. Patent Literature 1 decides a technique of deciding a state in which the pedestrian stands still from the movement of a pedestrian and correcting the gyro bias during a period in which the pedestrian stands still. Patent Literature 2 describes a technique estimating the traveling direction of the pedestrian from a map and correcting the gyro sensor. Patent Literature 3 describes a technique of calculating the traveling direction of an automobile from the gyro sensor and, in a case where the amount of change in the traveling direction is equal to or less than a threshold value, correcting the gyro sensor while regarding the traveling direction of the automobile extends along a straight line. Furthermore, Patent Literature 4 describes a technique of estimating the position of an automobile using a white line or a road sign observed from the automobile as a reference.

Patent Literature 1: Japanese Patent Application Re-publication No. 2010-001968
Patent Literature 2: Japanese Patent No. 5059933
Patent Literature 3: Japanese Patent Application Laid-open No. H07-324941
Patent Literature 4: Japanese Patent No. 4897542

SUMMARY OF INVENTION

Problems to be Solved by the Invention

The technique described in Patent Literature 1, however, has a problem that positioning starts with a wrong value if the time period in which the pedestrian stands still is not sufficient for the correction or if detection of the still state fails.

Moreover, the pedestrian does not always walk on a street on a map or along a lane, but the situation in which the pedestrian avoids another person or crosses the road usually occurs. Therefore, in the techniques described in Patent Literatures 2 and 4, erroneous correction may be performed because the traveling direction on the map is not always the actual traveling direction of the pedestrian.

In addition, the movement of the pedestrian does not always face the traveling direction, but relatively largely varies depending on the movement of the feet or the arms. Furthermore, the traveling direction in the walking motion of the pedestrian is so-called macroscopically formed by local and complicated movements such as rotation, vibration, pendulum motion, and vertical motion, that are synthesized. Therefore, there is a problem in the technique described in Patent Literature 3 that it is difficult to determine the threshold value for appropriately evaluating the amount of change with respect to the traveling direction of the pedestrian formed macroscopically, as the value appropriate for the gyro sensor detecting the local movement.

In the first plate, the techniques of Patent Literatures 3 and 4 are the ones applied to an object that is not largely different between when the movement thereof is observed locally and when the movement thereof is observed macroscopically, such as an automobile, and it is difficult to apply these techniques to the pedestrian as they are.

Means for Solving the Problem

In order to solve the above problems, the invention is a portable terminal device carried by a user. The portable terminal device includes: a gyro sensor that measures an angular velocity in movement of the portable terminal device to acquire angular velocity information; an acceleration sensor that measures an acceleration in the movement of the portable terminal device to acquire acceleration information; a camera that captures an image of a subject in surroundings during a time period in which the portable terminal device is moving, to acquire image information; a vector calculation element that calculates a motion vector of the subject based on the image information; a correlation decision element that decides a relative relation between a traveling direction by a walking motion of the user and an image-capturing direction of the camera in accordance with the angular velocity information acquired by the gyro sensor and the acceleration information acquired by the acceleration sensor; a rectilinear walking decision element that decides whether the user is in a rectilinear state in the walking motion in accordance with the motion vector of the subject calculated by the vector calculation element and the correlation relation decided by the correlation decision element; and a correction element that corrects the angular velocity information acquired by the gyro sensor in response to decision by the rectilinear walking decision element that the user is in the rectilinear state in the walking state.

The invention of an embodiment wherein the vector calculation element divides the image information into a plurality of blocks each having a first size, divides each of the blocks into a plurality of sub-blocks each having a second size smaller than the first size, detects an edge amount for every one of the sub-blocks, determines one of the sub-blocks providing a maximum edge amount in each of the blocks as a representative sub-block of the each of the blocks, and calculates a motion vector of the determined representative sub-block, thereby calculating the motion vector of the subject.

The invention of another embodiment wherein the vector calculation element averages the motion vector of the representative sub-block in every walking period of the user to obtain the motion vector of the subject.

The invention of another embodiment wherein the vector calculation element calculates the motion vector of the representative sub-block at a calculation timing synchronized with a walking period of the user.

The invention according to claim 5 is the portable terminal device according to claim 4, wherein a timing at which a velocity of the camera is the minimum, which comes at every walking period, is determined in accordance with the acceleration information acquired by the acceleration sensor, and the calculation timing is determined as the timing at which the velocity of the camera is the minimum.

The invention of another embodiment wherein the calculation timing is determined as a time at which both feet of the user are on the ground.

The invention of another embodiment wherein the camera captures the image of the subject in the surroundings during the time period in which the portable terminal device is moving, at an image-capturing timing synchronized with a walking period of the user.

The invention of another embodiment wherein a timing at which a velocity of the camera is the minimum, which comes at every walking period, is determined in accordance with the acceleration information acquired by the acceleration sensor, and the calculation timing is determined as the timing at which the velocity of the camera is the minimum.

The invention of another embodiment wherein the image-capturing timing is determined as a time at which both feet of the user are on the ground.

The invention of another embodiment wherein the walking period is determined in accordance with a time in which the user puts each of right and left feet by one step in the walking motion of the user.

The invention of another embodiment wherein the walking period is determined in accordance with a time in which the user puts each of right and left feet by one step in the walking motion of the user.

The invention of another embodiment wherein the correlation relation includes a relation in which the image-capturing direction of the camera faces the traveling direction by the walking motion of the user.

The invention of another embodiment wherein, in a case where the image-capturing direction of the camera faces the traveling direction by the walking motion of the user, the rectilinear walking decision element decides the walking motion of the user as being in the rectilinear state when the motion vector of the subject obtained by the vector calculation element is radial in the image information.

The invention of another embodiment is a portable device carried by a user including: a gyro sensor that measures an angular velocity in movement of the portable terminal device to acquire angular velocity information; an acceleration sensor that measures an acceleration in the movement of the portable terminal device to acquire acceleration information; a rectilinear walking decision element that compares the angular velocity information acquired by the gyro sensor and the acceleration information acquired by the acceleration sensor with a pattern in a walking motion that is given in advance, to decide whether the user is in a rectilinear state in the walking motion; and a correction element that corrects the angular velocity information acquired by the gyro sensor in response to decision by the rectilinear walking decision element that the user is in the rectilinear state in a walking state.

The invention of another embodiment wherein the rectilinear walking decision element performs the comparison with the pattern in accordance with a walking period in the walking motion of the user.

The invention of another embodiment wherein the walking period is determined in accordance with a time in which the user puts each of right and left feet by one step in the walking motion of the user.

The invention of another embodiment is a non-transitory computer readable storage medium storing computer-readable instructions that, when executed by a computer, cause the computer to perform a correction method. The method includes the steps of; measuring an angular velocity in movement of the computer by means of a gyro sensor to acquire angular velocity information; measuring an acceleration in the movement of the computer by means of an acceleration sensor to acquire acceleration information; capturing an image of a subject in surroundings by means of a camera during a time period in which the computer is moving, to acquire image information; calculating a motion vector of the subject based on the image information acquired by the camera; deciding a relative relation between a traveling direction by a walking motion of a user and an image-capturing direction of the camera in accordance with the angular velocity information acquired by the gyro sensor and the acceleration information acquired by the acceleration sensor; deciding whether the user is in a rectilinear state in the walking motion in accordance with the calculated motion vector of the subject and the correlation relation; and correcting the angular velocity information acquired by the gyro sensor in response to decision that the user is in the rectilinear state in a walking state.

The invention of another embodiment is a non-transitory computer readable storage medium storing computer-readable instructions that, when executed by a computer, cause the computer to perform a correction method. The method includes the steps of; measuring an angular velocity in movement of the computer by means of a gyro sensor to acquire angular velocity information; measuring an acceleration in the movement of the computer by means of an acceleration sensor to acquire acceleration information; comparing the angular velocity information acquired by the gyro sensor and the acceleration information acquired by the acceleration sensor with a pattern in a walking motion that is given in advance, to decide whether a user is in a rectilinear state in the walking motion; and correcting the angular velocity information acquired by the gyro sensor in response to decision that the user is in the rectilinear state in a walking state.

The invention of another embodiment is a correction method including the steps of: measuring an angular velocity in movement of a portable terminal device by means of a gyro sensor to acquire angular velocity information; measuring an acceleration in the movement of the portable terminal device by means of an acceleration sensor to acquire acceleration information; capturing an image of a subject in surroundings by means of a camera during a time period in which the portable terminal device is moving, to acquire image information; calculating a motion vector of the subject based on the image information acquired by the camera; deciding a relative relation between a traveling direction by a walking motion of a user and an image-capturing direction of the camera in accordance with the angular velocity information acquired by the gyro sensor and the acceleration information acquired by the acceleration sensor; deciding whether the user is in a rectilinear state in the walking motion in accordance with the calculated motion vector of the subject and the correlation relation; and correcting the angular velocity information acquired by the gyro sensor in response to decision that the user is in the rectilinear state in a walking state.

The invention of another embodiment is a correction method including the steps of: causing learning of a feature point of a pattern in a known walking motion of a user carrying a portable terminal device; measuring an angular velocity in movement of the portable terminal device by means of a gyro sensor to acquire angular velocity information; measuring an acceleration in the movement of the portable terminal device by means of an acceleration sensor to acquire acceleration information; comparing the angular velocity information acquired by the gyro sensor and the acceleration information acquired by the acceleration sensor with the feature point of the pattern to decide whether the user is in a rectilinear state in the walking motion; and correcting the angular velocity information acquired by the gyro sensor in response to decision that the user is in the rectilinear state in a walking state.

Advantageous Effects of Invention

According to the inventions of another embodiment, the motion vector of the subject is calculated based on the image information, the relative relation between the traveling direction by the walking motion of the user and the image-capturing direction of the camera is determined in accordance with the angular velocity information acquired by the gyro sensor and the acceleration information acquired by the acceleration sensor, and it is decided whether or not the user is in the rectilinear state in the walking motion in accordance with the calculated motion vector of the subject and the correlation relation. Thus, it can be decided whether or not the user is in the rectilinear state in the walking motion with high accuracy.

According to the inventions of another embodiment, the angular velocity information acquired by the gyro sensor and the acceleration information acquired by the acceleration sensor are compared with the pattern in the walking motion that is given in advance, thereby it can be decided whether or not the user is in the rectilinear state in the walking motion. Therefore, it is possible to accurately decide whether or not the user is in the rectilinear state in the walking motion, and it is unnecessary to provide the camera.

Figure 1:
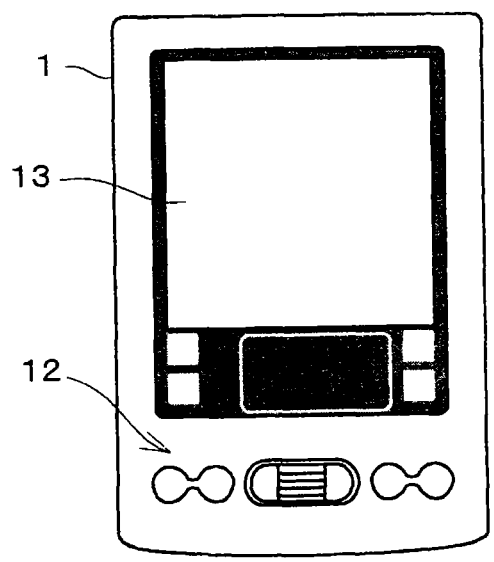
FIG. 1 illustrates a portable terminal device in a preferred embodiment.

DESCRIPTION OF REFERENCE SIGNS 1, 1a, 1b, 1c Portable terminal device
10 CPU
100, 100a, 100b Walking period calculation unit
101, 101a, 101b Vector calculation unit
102 Correlation decision unit
103, 103c Rectilinear walking decision unit
104 Correction unit
11 Storage device
110 Program
111 Motion vector information
112 Correlation decision information
12 Operation unit
13 Display unit
14 Gyro sensor
140 Angular velocity information
15 Acceleration sensor
150 Acceleration information
16, 16b Camera
160 Image information
161, 162, 163, 164 Block
161a Sub-block

DESCRIPTION OF EMBODIMENTS

Preferred embodiments of the present invention are described in detail below with reference to the accompanying drawings. In the following description, the descriptions related to directions and orientations correspond to those in the drawings for convenience of the description unless otherwise described, but are not intended to limit products for which the present invention is put into practice, manufactured products, or the scope of patent rights, for example.

The present application claims priority from Japanese Patent Application No. 2013-072311 filed in Japan on Mar. 29, 2013, the contents of which are incorporated herein by reference.

FIG. 1 illustrates a portable terminal device 1 in a preferred embodiment. The portable terminal device 1 includes an operation unit 12 and a display unit 13 and is configured as a device carried by a user.

In the following description, a walking motion of a user as a pedestrian does not distinguish between whether the user is walking or running. Moreover, "one step" in the walking motion is defined as a motion in a time period from when a person starts raising a foot thereof before the person starts raising another foot, during which the person puts the raised foot forward and puts the raised foot on the ground. "One pair of steps" is defined as a motion containing the motion of one step of the right foot and the motion of one step of the left foot. "Time for one pair of steps" is defined as time required for one pair of steps.

The operation unit 12 is hardware operable by a user for giving an instruction to the portable terminal device 1. As the operation unit 12, various buttons, keys, a rotary selector, a touch panel, and the like are considered.

The display unit 13 is hardware having a function of displaying various kinds of information to the user to provide the information. As the display unit 13, a lamp, an LED, a liquid crystal panel, a liquid crystal display, an organic EL display, and the like are considered.

Figure 2:
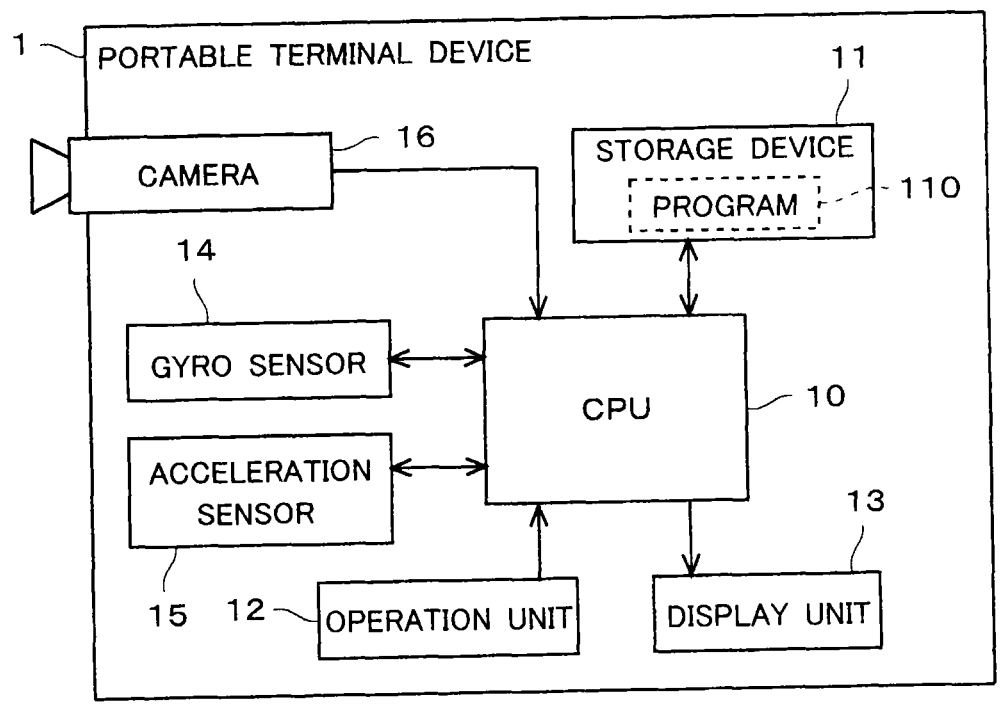
FIG. 2 is a block diagram of the portable terminal device in the preferred embodiment.

FIG. 2 is a block diagram of the portable terminal device 1 in the preferred embodiment. In addition to the operation unit 12 and the display unit 13 described before, the portable terminal device 1 includes a CPU 10, a storage device 11, a gyro sensor 14, an acceleration sensor 15, and a camera 16.

The CPU 10 executes a program 110 stored in the storage device 11 while reading it, thereby performing calculation of various kinds of data, generation of control signals, and the like. Thus, the CPU 10 has a function of controlling various components included in the portable terminal device 1 and calculating and creating various kinds of data. That is, the portable terminal device 1 is configured as a general computer.

The storage device 11 provides a function of storing various kinds of data in the portable terminal device 1. In other words, the storage device 11 stores electronically fixed information in the portable terminal device 1. In particular, the storage device 11 in the preferred embodiment is used for storing the program 110.

As the storage device 11, a RAM and a buffer used as a temporal working area of the CPU 10, a read-only ROM, a non-volatile memory (e.g., a NAND memory), a hard disk storing a relatively large amount of data, a portable recording medium (e.g., a PC card, an SD card, a USB memory) mounted onto a dedicated reader device can be considered, for example. In FIG. 2, the storage device 11 is shown as if it formed a single structure. However, the storage device 11 is usually formed by more than one of the above listed various types of devices (or medium), which are employed as necessary. That is, in the preferred embodiment, the storage device 11 is a general term referring to devices each having a function of storing data.

The actual CPU 10 is an electronic circuit including therein a RAM that allows a high-speed access thereto. Such a storage device included in the CPU 10 is described as being also included in the storage device 11 for convenience of the description. That is, in the preferred embodiment, it is described that data temporarily stored by the CPU 10 itself is also stored in the storage device 11.

Figure 3:
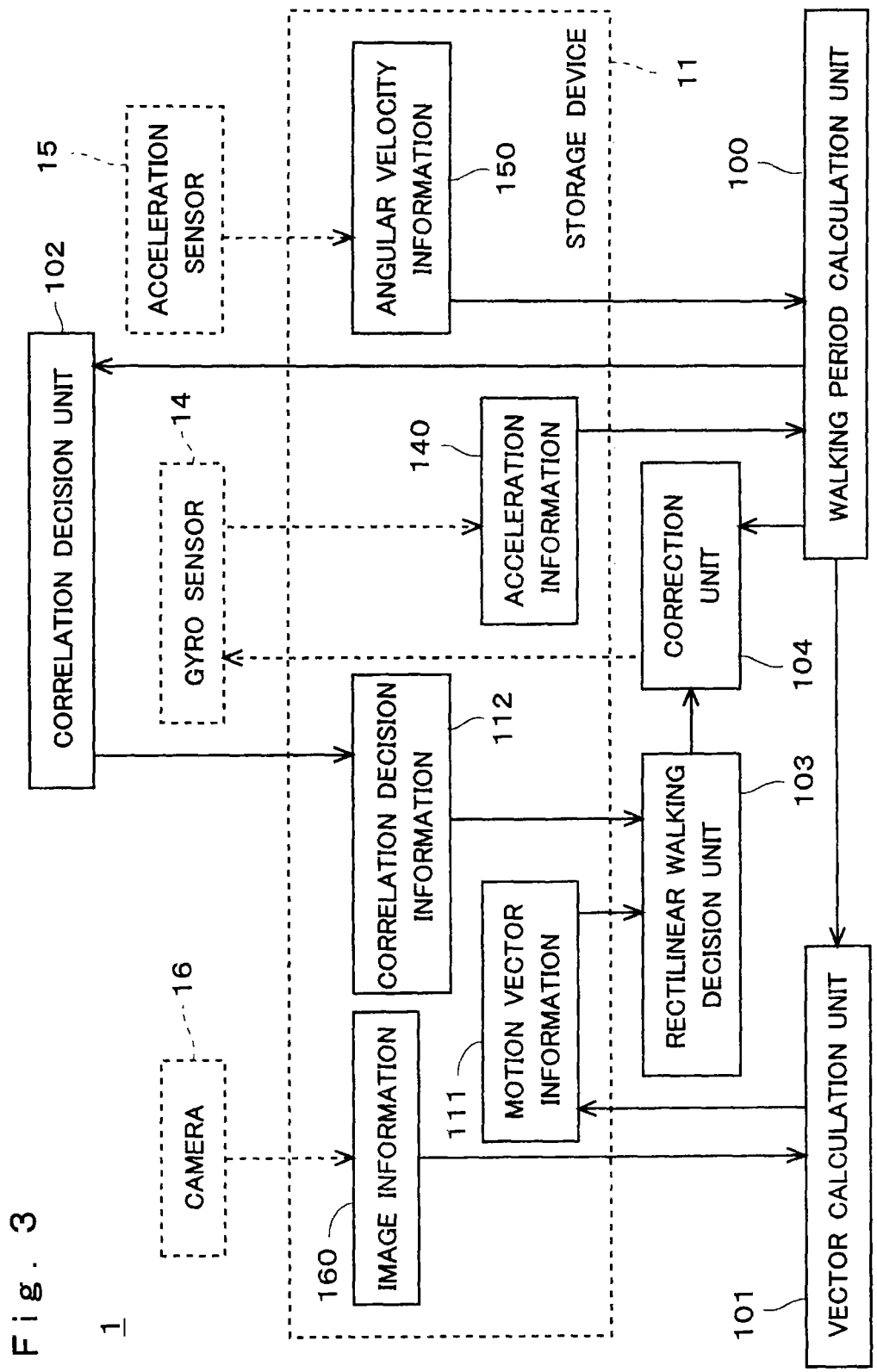
FIG. 3 shows functional blocks provided in the portable terminal device in the preferred embodiment, together with a data flow.

The gyro sensor 14 measures an angular velocity in the movement of the portable terminal device 1 to acquire angular velocity information 140 (see FIG. 3). In the following description, a period at which the gyro sensor 14 acquires the angular velocity information 140 (sampling period) is referred to as "Ts".

The acceleration sensor 15 measures an acceleration in the movement of the portable terminal device 1 to acquire acceleration information 150 (see FIG. 3).

The camera 16 includes an optical element such as a lens or a mirror and a photoelectric conversion element such as a CCD, although the details are not shown, and is configured as a general digital camera. The camera 16 captures an image of a subject in the surroundings at least for a time period in which the portable terminal device 1 is moving, to acquire image information 160 (see FIG. 3).

The camera 16 is configured to perform image capturing at a predetermined image-capturing timing in response to a control signal from the CPU 10. The camera 16 in the preferred embodiment performs image capturing at an image-capturing period of "Tc" to acquire new image information 160.

FIG. 3 shows functional blocks provided in the portable terminal device 1 in the preferred embodiment, together with a data flow. A walking period calculation unit 100, a vector calculation unit 101, a correlation decision unit 102, a rectilinear walking decision unit 103, and a correction unit 104 that are shown in FIG. 3 are the functional blocks achieved by the operation of the CPU 10 in accordance with the program 110.

The walking period calculation unit 100 refers to the angular velocity information 140 and the acceleration information 150 to determine a walking period in the walking motion of the user (pedestrian). The walking period calculation unit 100 transmits the determined walking period to the vector calculation unit 101 and the correction unit 104. The walking period calculation unit 100 also has a function of transmitting a traveling direction of the user to the correlation decision unit 102, although the details will be described later.

The vector calculation unit 101 has a function of calculating a motion vector of a subject in the image information 160 based on the image information 160, thereby creating motion vector information 111. An interval at which the vector calculation unit 101 calculates the motion vector is hereinafter referred to as a calculation interval "Tv". The motion vector is calculated by comparison of two still images (image information 160) captured with the calculation interval Tv therebetween. Therefore, the calculation interval is integral multiple of the image-capturing interval, i.e., Tv=n×Tc (n is a natural number).

Please note that the "motion vector of the subject in the image information 160" herein is strictly the one obtained by synthesizing a motion vector of an apparent movement of the subject caused by the movement of the portable terminal device 1 in association with the motion of the user and a motion vector generated by the movement of the subject itself. However, in the following description, the subject is treated as being stationary and the motion vector generated by the movement of the subject itself is ignored. Moreover, the vector calculation unit 101 in the preferred embodiment treats the walking period transmitted from the walking period calculation unit 100 as being contained in the motion vector information 111.

The correlation decision unit 102 decides a relative relation between a traveling direction by the walking motion of the user and an image-capturing direction of the camera 16 in accordance with the angular velocity information 140 acquired by the gyro sensor 14 and the acceleration information 150 acquired by the acceleration sensor 15. However, although the details will be described later, the correlation decision unit 102 in the preferred embodiment uses the traveling direction obtained in the process in which the walking period calculation unit 100 calculates the walking period based on the angular velocity information 140 and the acceleration information 150.

The result of the decision by the correction decision unit 102 is stored as correlation decision information 112.

The rectilinear walking decision unit 103 decides whether or not the user is in a rectilinear state in the walking motion in accordance with the motion vector information 111 calculated by the vector calculation unit 101 and the correlation relation (correlation decision information 112) decided by the correlation decision unit 102.

The correction unit 104 has a function of correcting a bias value (bv) of the gyro sensor 14 in response to the decision by the rectilinear walking decision unit 103 that the user is in the rectilinear state in the walking state. The correction unit 104 also has a function of retroactively correcting the angular velocity information 140 already acquired.

The structure and the functions of the portable terminal device 1 in the preferred embodiment are described above. Next, a correction method is described which corrects the angular velocity information 140 that is the value measured by the gyro sensor 14 in the portable terminal device 1.

Figure 4:
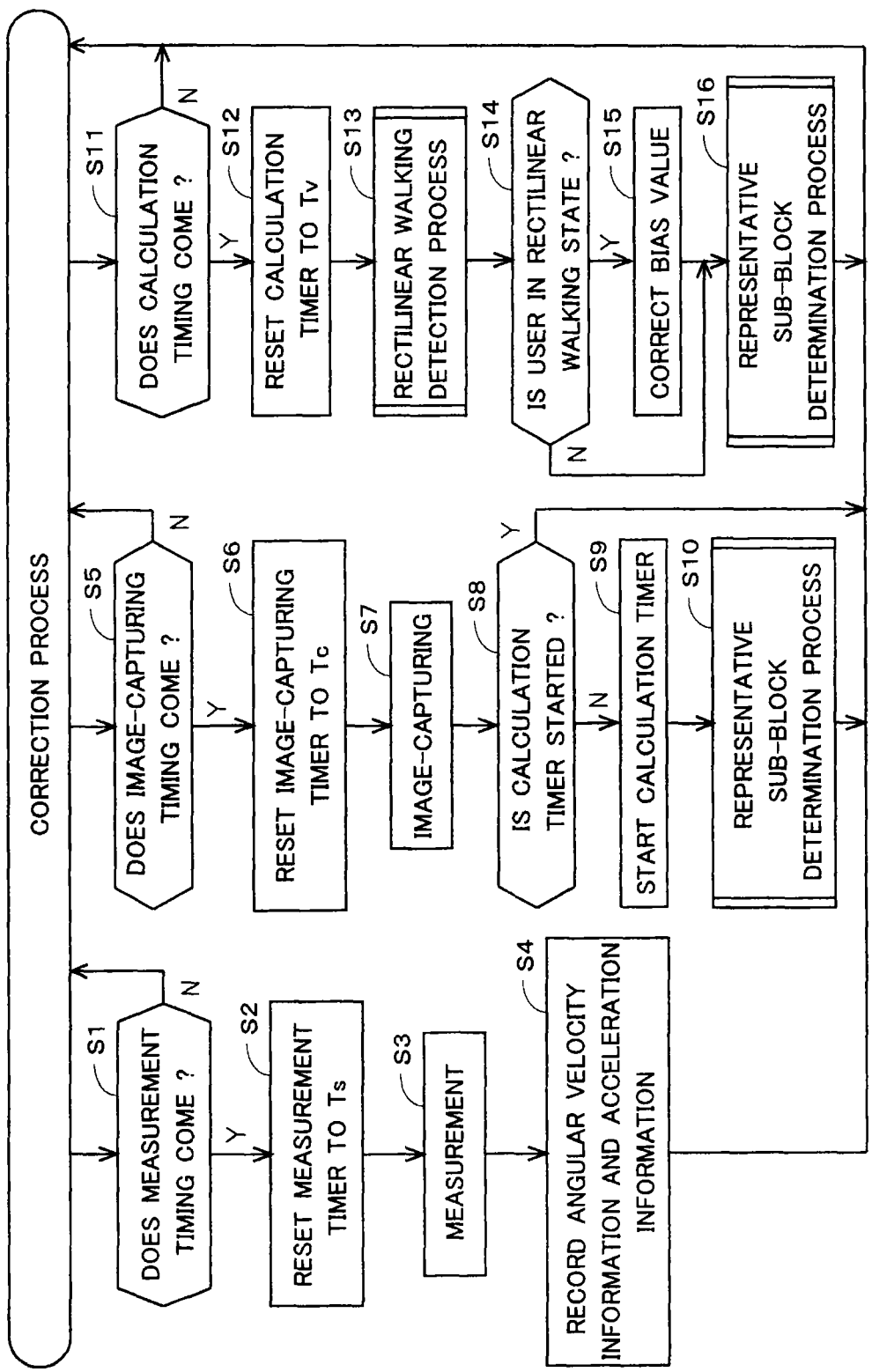
FIG. 4 is a flowchart illustrating a correction process for a gyro sensor in the preferred embodiment.

FIG. 4 is a flowchart illustrating a correction process for the gyro sensor 14 in the preferred embodiment.

In the portable terminal device 1, another process may be performed in parallel with the process shown in FIG. 4 or in such a manner that the other process shares a portion thereof with the process shown in FIG. 4. The other process may be a positioning process that identifies the position of the user, a destination guide process using the result of the positioning process, or a route recording process, for example.

It is assumed that before the start of the process shown in FIG. 4, predetermined initial setting is performed in the portable terminal device 1. The initial setting includes a process of setting Ts in a measurement timer for measuring a timing of the measurement by the gyro sensor 14 and the acceleration sensor 15 and activating the measurement timer, and a process of setting Tc in an image-capturing timer for measuring a timing of image capturing by the camera 16 and activating the image-capturing timer, but a calculation timer is not activated. This is because the process of calculating the motion vector cannot be executed before at least one unit of image information 160 is acquired and a representative sub-block that will be described later is determined.

Moreover, the initial setting includes a process of setting an initial value of the bias value (bv) of the gyro sensor 14 and a process of determining the posture of the portable terminal device 1 (the posture at the process start). As a method for determining the initial posture of the portable terminal device 1, a method in which the user operates the operation unit 12 of the portable terminal device 1 to input the posture and a method in which the posture is determined by the output of a magnetic sensor that is not shown can be considered.

When the initial setting is finished, the portable terminal device 1 is placed in a state in which it monitors the measurement timer, the image-capturing timer, and the calculation timer (Steps S1, S5, and S11). In the following description, that state is referred to as a "monitor state". In the monitor state, the portable terminal device 1 may execute another process than Steps S1, S5, and S11.

In the monitor state, when the measurement timer becomes zero and the measurement timing comes, the CPU 10 gives Yes as the result in decision in Step S1, resets the measurement timer to Ts (Step S2), and reads out the values of the gyro sensor 14 and the acceleration sensor 15. Thus, the measurement of the angular velocity and the acceleration related to the movement of the portable terminal device 1 is performed (Step S3).

The value of the gyro sensor 14 read out in Step S3 is acquired based on the initial value of the bias value bv, when correction of the bias value bv (detailed later) has not yet been performed. After the correction of the bias value bv is performed, the value of the gyro sensor 14 is acquired as a value corrected with the corrected bias value bv.

The CPU 10 then creates angular velocity information 140 and acceleration information 150 based on the read values of the gyro sensor 14 and the acceleration sensor 15, and records them in the storage device 11 (Step S4). In the preferred embodiment, the angular velocity information 140 and the acceleration information 150 are not overwritten onto the past record, but are recorded to form a history in the order of acquisition.

In this manner, the portable terminal device 1 gives Yes as the result in decision in Step S1 every time the value of the measurement timer becomes zero, and executes the processes from Step S2 to S4. Therefore, the angular velocity and the acceleration are measured at every measurement period Ts in the portable terminal device 1. When executing Step S4, the portable terminal device 1 returns to the monitor state again.

In the monitor state, when the image-capturing timer becomes zero and the image-capturing timing comes, the CPU 10 gives Yes as the result in decision in Step S5, resets the image-capturing timer to Tc (Step S6), and controls the camera 16 to capture an image of a subject in the surroundings. Thus, the camera 16 performs image capturing (Step S7), and image information 160 is created and is recorded in the storage device 11. In the process of Step S7, it is assumed that deletion or overwriting of the image information 160 is not performed. In other words, the image information 160 is recorded in the order of image capturing.

When image capturing is performed and new image information 160 is recorded, the CPU 10 decides whether or not the calculation timer for measuring the calculation timing is activated (Step S8). When the calculation timer is not activated, the CPU 10 sets Tv in the calculation timer and activates it (Step S9), and executes a representative sub-block determination process (Step S10). On the other hand, when the calculation timer is already activated, Steps S9 and S10 are skipped and the portable terminal device 1 returns to the monitor state.

Figure 5:
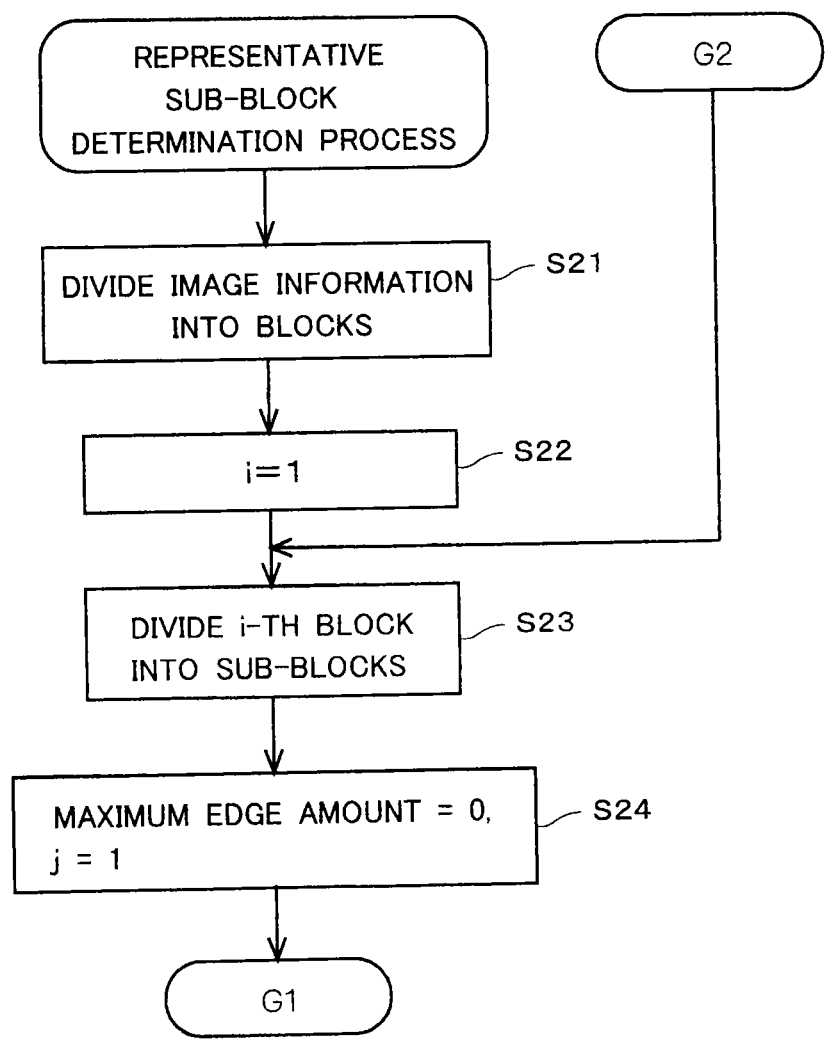
FIG. 5 is a flowchart illustrating a representative sub-block determination process in the preferred embodiment.
Figure 6:
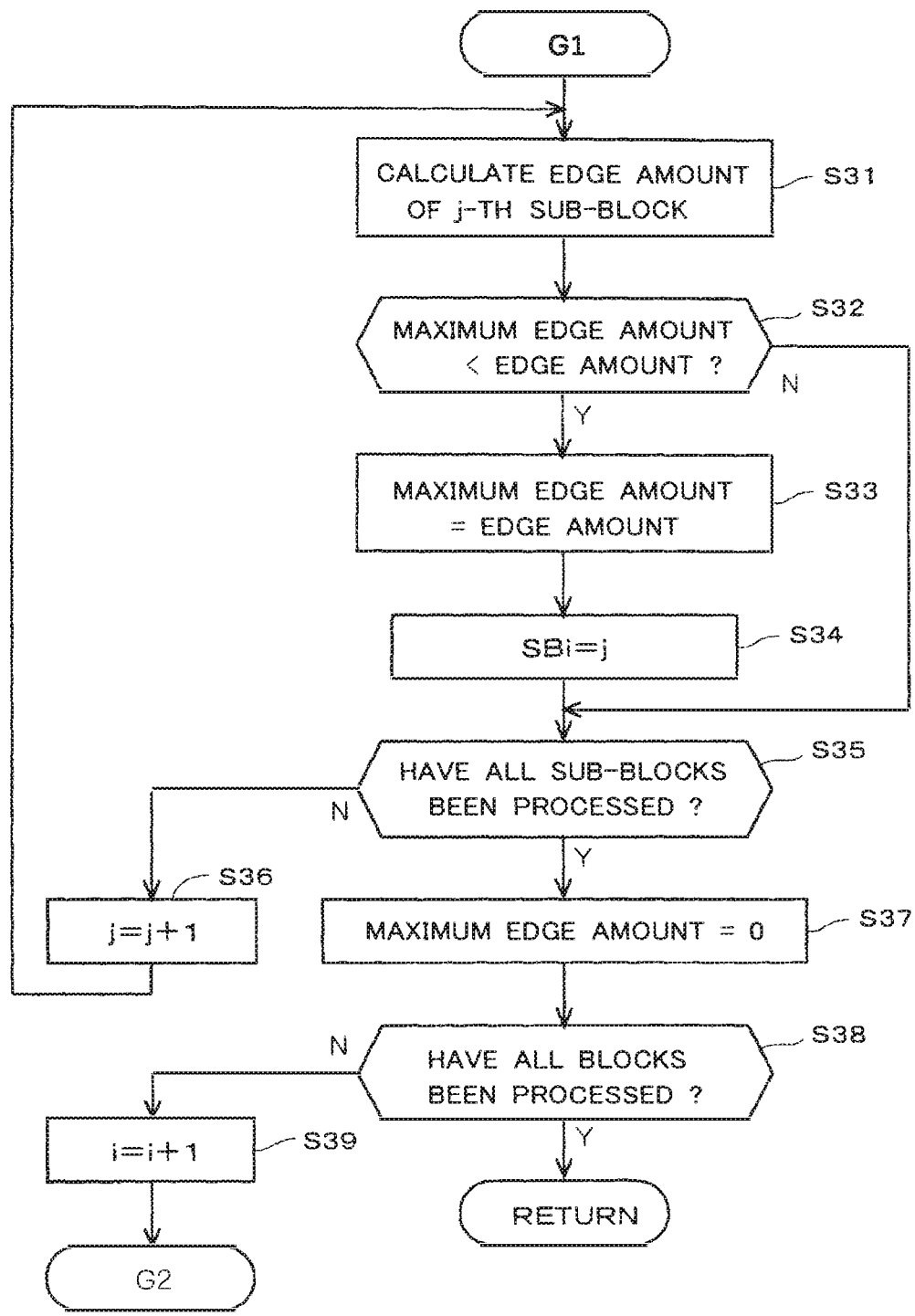
FIG. 6 is a flowchart illustrating the representative sub-block determination process in the preferred embodiment.

FIG. 5 and FIG. 6 are flowcharts illustrating a representative sub-block determination process in the preferred embodiment.

When the representative sub-block determination process is started, the vector calculation unit 101 acquires the latest image information 160 and divides it into a plurality of blocks (Step S21).

Figure 7:
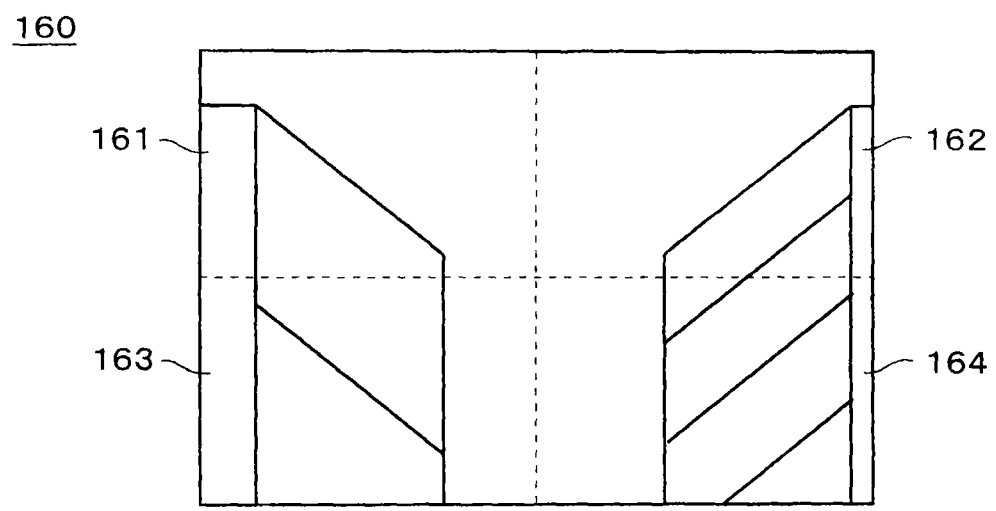
FIG. 7 shows division of image information by a vector calculation unit.

FIG. 7 shows division of the image information 160 by the vector calculation unit 101. FIG. 7 shows a subject in the surroundings (image information 160) captured when the user is walking through a path on both side of which shelves for merchandise display are arranged, as an example.

In Step S21, the vector calculation unit 101 divides the image information 160 into a plurality of blocks each having the first size. Each block corresponds to a partial image of the image information 160. In the example of FIG. 7, the image information 160 is divided into four blocks 161, 162, 163, and 164.

The vector calculation unit 101 then resets the value of a block counter i to "1" (Step S22). The block counter i is a counter for specifying a block that is being processed. As illustrated in FIG. 7, since the vector calculation unit 101 in the preferred embodiment divides the image information 160 into four blocks, the value of the block counter i is an integer from "1" to "4".

The vector calculation unit 101 then further divides the i-th block indicated by the block counter i into sub-blocks (Step S23).

Figure 8:
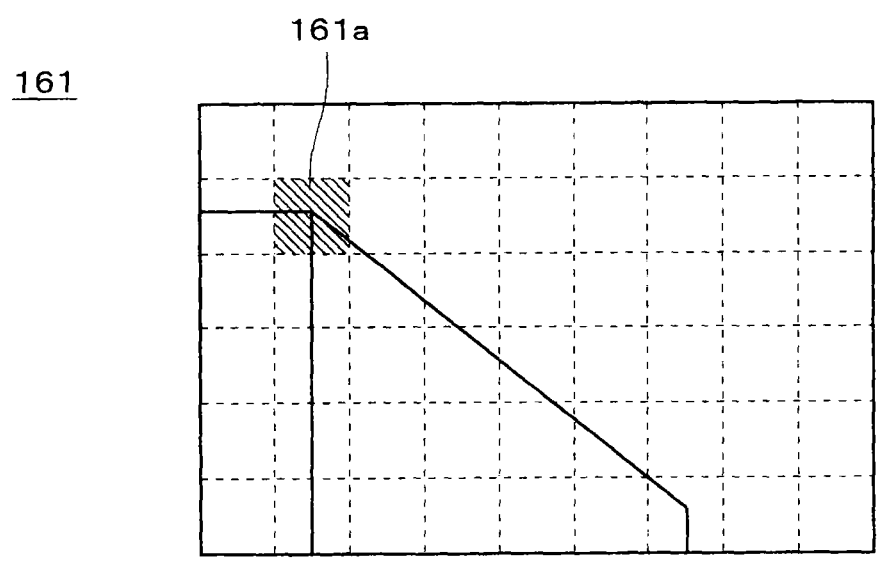
FIG. 8 shows division of a block shown in FIG. 7 by the vector calculation unit.

FIG. 8 shows division of the block 161 in FIG. 7 by the vector calculation unit 101. In FIG. 8, the block 161 in FIG. 7 is shown while being enlarged.

In Step S23, the vector calculation unit 101 divides the i-th block into a plurality of sub-blocks each having the second size smaller than the first size. Each sub-block corresponds to a partial image of the image information 160. In the example of FIG. 8, the block 161 is divided into 54 sub-blocks.

When performing Step S23, the vector calculation unit 101 resets the value of the maximum edge amount to "0" and resets the value of a sub-clock counter j to "1" (Step S24). The maximum edge amount is a variable in which the maximum edge amount of a sub-block contained in the block that is being processed is temporarily stored. The sub-block counter j is a counter for specifying the sub-block that is being processed. As illustrated in FIG. 8, since the vector calculation unit 101 divides one block into 54 sub-blocks, the value of the sub-block counter j is an integer from "1" to "54".

Subsequently, the vector calculation unit 101 calculates the edge amount of the j-th sub-block indicated by the sub-block counter j among the plural sub-blocks obtained by division in Step S23 (Step S31), and decides whether or not the obtained edge amount of the j-th sub-block is larger than the maximum edge amount (Step S32).

In a case of Yes in Step S32, the vector calculation unit 101 employs the value of the j-th edge amount as a new maximum edge amount (Step S33), and sets "j" in an identifier SBi for identifying a representative sub-block in the i-th block (Step S34). That is, in a case where the edge amount of the j-th sub-block is larger than those of the first to (j−1)th sub-blocks, the edge amount of the j-th sub-block is stored as the maximum edge amount and "j" is stored in the identifier SBi.

On the other hand, in a case of No in Step S32, the vector calculation unit 101 does not determine the j-th sub-block as the representative sub-block. Thus, the processes of Steps S33 and S34 are skipped.

The vector calculation unit 101 then decides whether or not calculation and evaluation of the edge amounts related to all the sub-blocks for the i-th block have been finished (Step S35). In the preferred embodiment, since the number of sub-blocks in the i-th block is 54, it is enough to decide whether j=54 is established in Step S35, for example.

In a case of No in Step S35 (i.e., the calculation and the evaluation have not yet been finished for all the sub-blocks), the vector calculation unit 101 increments the value of j (Step S36) and repeats the processes from S31. That is, the vector calculation unit 101 continues to perform the process for the next sub-block of the i-th block.

In a case of Yes in Step S35 (i.e., the calculation and the evaluation have been finished for all the sub-blocks), the vector calculation unit 101 resets the value of the maximum edge amount to "0" (Step S37), and ends the process for the i-th block. That is, the vector calculation unit 101 determines the sub-block indicated by the identifier SBi as the representative sub-block of the i-th block.

Subsequently the vector calculation unit 101 decides whether or not determination of the representative sub-block has been finished for all the blocks (Step S38). In the preferred embodiment, since the number of blocks is four, it is enough to decide whether i=4 is established in Step S38, for example.

In a case of No in Step S38 (i.e., the determination of the representative sub-block has not yet been finished for all the blocks), the vector calculation unit 101 increments the value of i (Step S39) and repeats the processes from S23. That is, the vector calculation unit 101 continues to perform the process for the next block.

In a case of Yes in Step S38 (i.e., the determination of the representative sub-block has been finished for all the blocks), the vector calculation unit 101 ends the representative sub-block determination process, and returns to the process in FIG. 4.

In this manner, the vector calculation unit 101 detects the edge amount for every one of the sub-blocks, and determines the sub-block providing the maximum edge amount in each of the plural blocks as the representative sub-block of that block. In the example of FIG. 8, the sub-block 161*a* containing a corner of the display shelf is determined as the representative sub-block of the block 161. Also in each of the blocks 162, 163, and 164, the sub-block providing the maximum edge amount is determined as the representative sub-block, although not shown in FIG. 8.

The portable terminal device 1 is intended to detect the movement of the portable terminal device 1 based on the motion vector of the representative sub-block. For calculating the motion vector, it is preferable to extract a portion (sub-block) of an image providing the large edge amount and perform calculation.

The vector calculation unit 101 in the preferred embodiment determines the sub-block providing the maximum edge amount in each block as the representative sub-block in that block, as described before. Thus, it is possible to calculate the motion vector with high accuracy.

On the other hand, for estimating the movement of the portable terminal device 1 (the movement of the user) based on the calculated motion vector, it is preferable that the positions of the calculated motion vectors in the image information 160 are dispersed. That is, it is preferable that the representative sub-blocks are selected from various places within the image information 160.

The vector calculation unit 101 in the preferred embodiment divides one still image in the image information 160 into four blocks and determines the representative sub-block in each of the blocks, as described before. Thus, it is possible to suppress localization of the sub-blocks, for which the motion vectors are calculated, within the image information 160. Therefore, it is possible to accurately decide in a process described later whether or not the traveling direction of the user is rectilinear.

Referring back to FIG. 4, in the monitor state, when the calculation timer becomes zero and the calculation timing comes, the CPU 10 gives Yes as the result in decision in Step S11, resents the calculation timer to Tv (Step S12), and performs a rectilinear walking detection process (Step S13).

Figure 9:
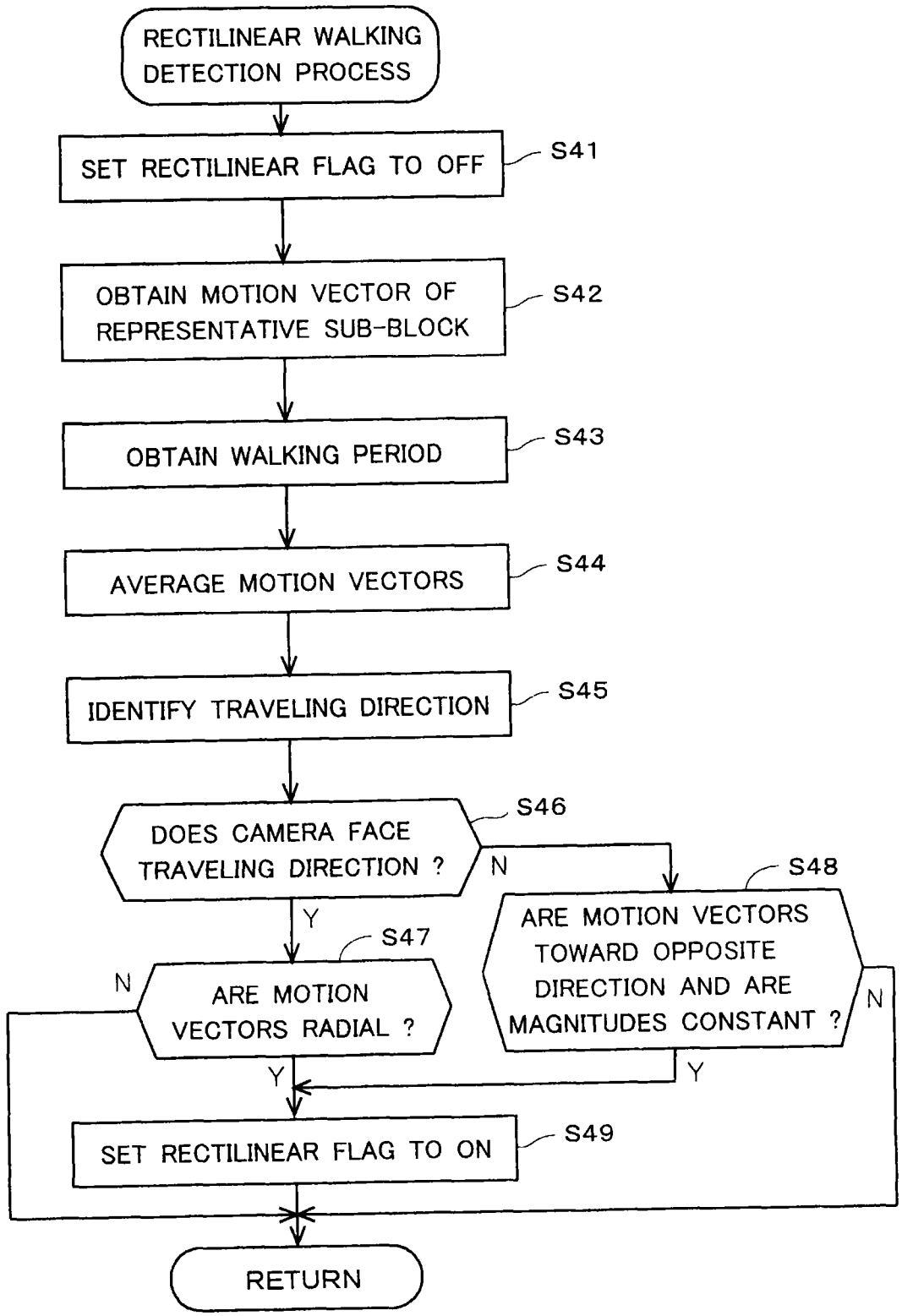
FIG. 9 is a flowchart illustrating a rectilinear walking detection process in the preferred embodiment.

FIG. 9 is a flowchart illustrating the rectilinear walking detection process in the preferred embodiment.

When the rectilinear walking detection process is started, the rectilinear walking decision unit 103 resets a rectilinear flag indicating whether or not the walking motion of the user is in a rectilinear state to OFF (Step S41).

The vector calculation unit 101 then obtains the motion vector of each representative sub-block for a time period from when the position of the each representative sub-block in the latest image information 160 is identified and the each representative sub-block is determined (the image information 160 for which the representative sub-blocks are determined is captured) to when that latest image information 160 is captured (Step S42).

The time period from the determination of the representative sub-block to the image capturing of the latest image information 160 is managed by the calculation timer and is the calculation period Tv. That is, in Step S42, the motion vector for a time period of Tv is calculated. In a case where the image-capturing period Tc can be regarded as being discrete with respect to the calculation period Tv, however, that time period is n×Tc (where n×Tc=Tv<(n+1)×Tc).

Subsequently, the walking period calculation unit 100 obtains a walking period in the walking motion of the user.

Figure 10:
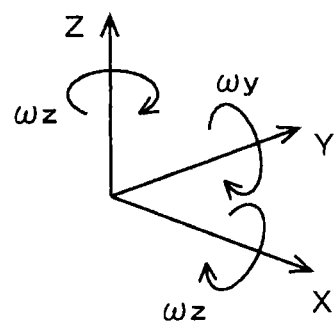
FIG. 10 shows a coordinate system of the gyro sensor, an acceleration sensor, and a camera.

FIG. 10 illustrates a coordinate system in the gyro sensor 14, the acceleration sensor 15, and the camera 16. In the portable terminal device 1, all the gyro sensor 14, the acceleration sensor 15, and the camera 16 are fixed. Therefore, even if the posture of the portable terminal device 1 changes, the relative positional relationship between the gyro sensor 14, the acceleration sensor 15, and the camera 16 is not changed.

As shown in FIG. 10, in the portable terminal device 1 in the preferred embodiment, the image-capturing direction of the camera 16 is assumed to be X-axis. The acceleration sensor 15 is arranged so that one of three axes thereof is coincident with X-axis, and the other two are arranged along Y-axis and Z-axis, respectively. Thus, the outputs of the acceleration sensor 15 are an acceleration in X-axis direction ax, an acceleration in Y-axis direction ay, and an acceleration in Z-axis direction az.

Next, the gyro sensor 14 measuring angular velocities around three axes is arranged so that three axes thereof are coincident with X-axis, Y-axis, and Z-axis, respectively. Thus, the outputs of the gyro sensor 14 are an angular velocity around X-axis ωx, an angular velocity around Y-axis ωy, and an angular velocity around Z-axis ωz.

Even if the above arrangement cannot be used, the output values of the gyro sensor 14 and the acceleration sensor 15 can be converted to values corresponding to X-axis, Y-axis, and Z-axis based on the relative positional relationship among the gyro sensor 14, the acceleration sensor 15, and the camera 16 that is known, because that relative positional relationship is not changed.

Figure 11:
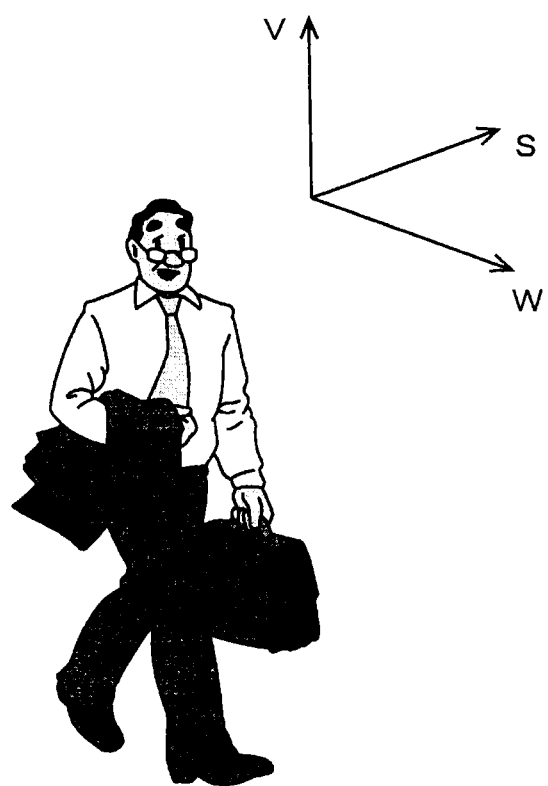
FIG. 11 shows a coordinate system in a walking motion of a user.

FIG. 11 illustrates a coordinate system in the walking motion of the user. As shown in FIG. 11, it is assumed that the opposite direction to gravity is V-axis and the traveling direction of the user is W-axis. The traveling direction of the user is defined in a horizontal plane, and V-axis and W-axis are assumed to be perpendicular to each other. Moreover, it is assumed that an axis perpendicular to W-axis and V-axis is S-axis.

First, the walking period calculation unit 100 estimates a gravity direction vector based on the acceleration information 150 using the conventional Kalman filter. As the opposite direction of the gravity direction vector thus estimated, V-axis is determined.

When V-axis is determined, the walking period calculation unit 100 rotates Z-axis to be coincident with V-axis and acquires a rotation angle θ1 in this rotation. Then, the walking period calculation unit 100 performs 360-degree rotation around Z-axis while Z-axis is coincident with V-axis (i.e., Z-axis is rotated by θ1), and calculates ay and ay. In general, the walking motion of a person has characteristics that the acceleration in W-axis direction (traveling direction) is large and the acceleration in S-axis direction (right and left directions with respect to the traveling direction) is small. Therefore, the rotation angle θ2 providing the maximum az and the minimum ay during 360-degree rotation around Z-axis is determined, and X-axis and Y-axis at that time are determined as W-axis and S-axis, respectively.

By using the thus obtained rotation angles θ1 and θ2, the walking period calculation unit 100 can convert the output values of the XYZ coordinate system to those of the WSV coordinate system. That is, from the accelerations ax, ay, and az, the acceleration in W-axis direction aw, the acceleration in S-axis direction as, and the acceleration in V-axis direction av can be obtained. Similarly, from the angular velocities ωx, ωw, and ωz, the angular velocity around W-axis ωw, the angular velocity around S-axis ωs, and the angular velocity around V-axis ωv can be obtained.

Figure 12:
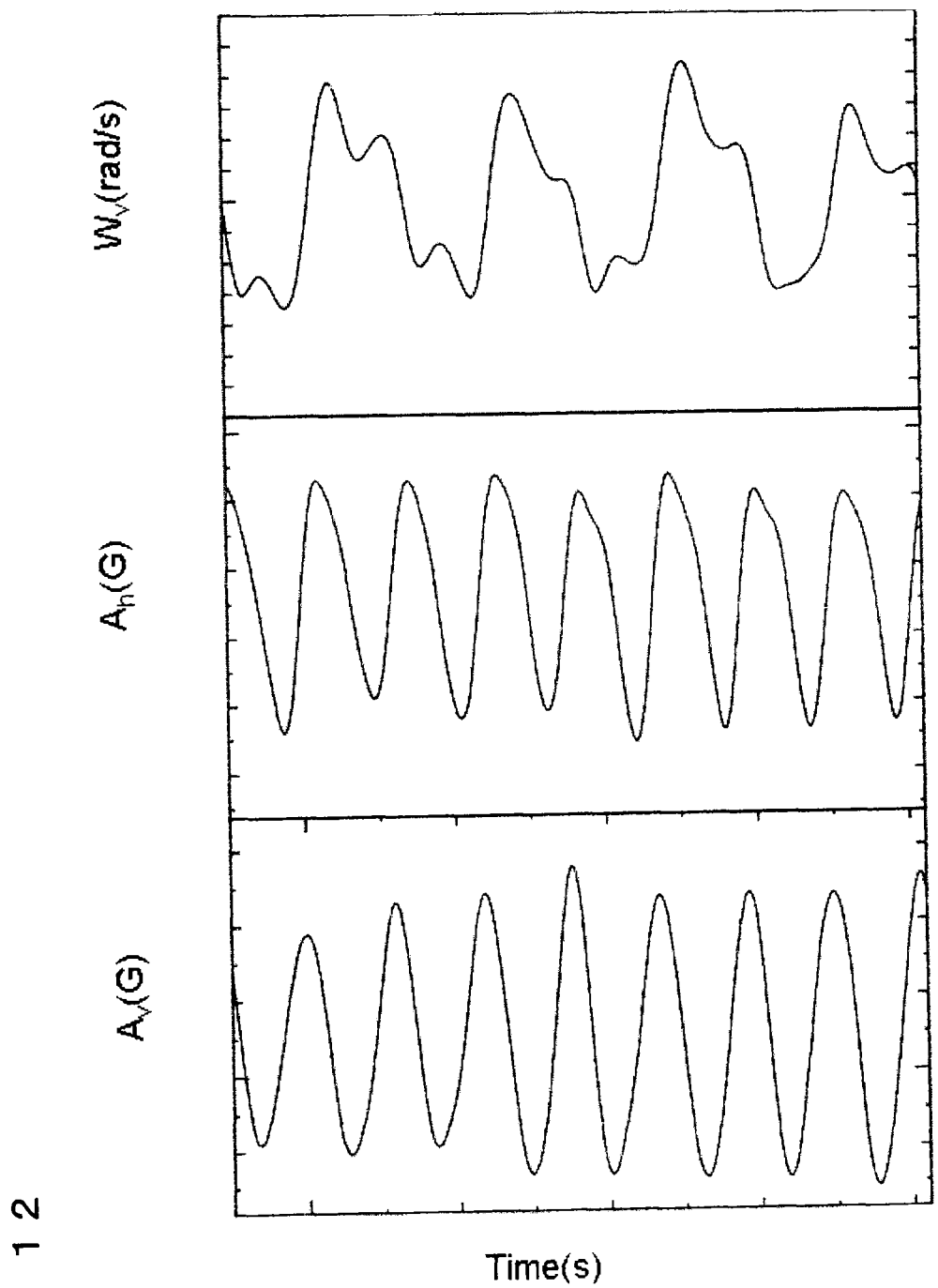
FIG. 12 shows an example of accelerations av and aw and an angular velocity ωv in a walking motion of a person.

FIG. 12 shows an example of the accelerations av and aw and the angular velocity ωv in the walking motion of a person.

As is apparent from FIG. 12, the accelerations av and aw have a period of one step, while the angular velocity ωv has a period of one pair of steps. Therefore, it can be said that as the period of the walking motion, the period of one pair of steps is appropriate.

Moreover, because the angular velocity ωv changes in a relatively complicated manner, it is also found that for determining the walking period, the use of the acceleration av or aw is better. For example, a time period from when the acceleration aw has a local minimum value to when it has a local minimum value twice again is the period of one pair of steps and is the walking period.

In this manner, in Step S43, the walking period calculation unit 100 determines the walking period based on the angular velocity information 140 and the acceleration information 150. The detection of the local minimum value can use zero-crossing, for example.

When determining the walking period, the walking period calculation unit 100 transfers the determined walking period to the vector calculation unit 101. The vector calculation unit 101 then averages the motion vectors obtained in Step S42 in every walking period (Step S44), and uses it as the motion vector of the subject. Since the vector calculation unit 101 obtains the motion vector of the subject in this manner, the effects of movement other than the movement in the traveling direction can be suppressed.

Subsequently, the correlation decision unit 102 obtains the traveling direction of the user (Step S45). In the preferred embodiment, the traveling direction is determined as W-axis direction by the walking period calculation unit 100 at the time of execution of Step S43. Therefore, the correlation decision unit 102 in the preferred embodiment does not obtain again the traveling direction from the angular velocity information 140 and the acceleration information 150 in Step S45, but uses W-axis direction transmitted from the walking period calculation unit 100.

When Step S45 is performed, the correlation decision unit 102 decides whether or not the camera 16 faces the traveling direction from the relationship between X-axis (the orientation of the camera 16) and W-axis (the traveling direction) (Step S46), and stores the decision result as correlation decision information 112 in the storage device 11. The correlation decision information 112 is referred to by the rectilinear walking decision unit 103.

In a case of Yes in Step S46, the rectilinear walking decision unit 103 decides whether or not the motion vectors of the subject obtained by the vector calculation unit 101 in Step S44 are radial from around the center of the image information 160 (Step S47). When the motion vectors are radial (Yes in Step S47), the rectilinear walking decision unit 103 decides the walking motion of the user as being in a rectilinear state, sets the rectilinear flag to ON (Step S49), and ends the rectilinear walking detection process. When the motion vectors are not radial (No in Step S47), it is decided that the walking motion of the user is not in the rectilinear state, and therefore the rectilinear flag is kept OFF and the rectilinear walking detection process is ended.

In a case of No in Step S46, the rectilinear walking decision unit 103 decides whether or not the motion vectors of the subject obtained by the vector calculation unit 101 in Step S44 are opposite to the traveling direction and the magnitudes thereof are approximately constant during a time period in which the walking motion does not change (Step S48). In a case of Yes in Step S48, the rectilinear walking decision unit 103 decides the walking motion of the user as being in the rectilinear state, sets the rectilinear flag to ON (Step S49), and ends the rectilinear walking detection process. In a case of No in Step S48, the rectilinear walking decision unit 103 decides the walking motion of the user as not being in the rectilinear state, and ends the rectilinear walking detection process while keeping the rectilinear flag OFF.

Thus, when the rectilinear walking detection process is ended, it is detected whether or not the walking motion of the user is in the rectilinear state and the detection result is stored as the status of the rectilinear flag.

Referring back to FIG. 4, when the rectilinear walking detection process is ended, the rectilinear walking decision unit 103 transmits the status of the rectilinear flag to the correction unit 104. In response to this, the correction unit 104 is made to decide whether or not the walking state of the user is the rectilinear state (Step S14).

In a case of the rectilinear state (Yes in Step S14), the correction unit 104 corrects the bias value of the gyro sensor 14 (Step S15).

The principle of correction of the bias value of the gyro sensor 14 by the correction unit 104 in Step S15 is described. Please note that when positioning for the user as the pedestrian is performed, there is less necessity for considering the angular velocities of the user around W-axis and S-axis $\omega w$ and $\omega s$. Therefore, an example of correcting the angular velocity around V-axis $\omega v$ (this affects the traveling direction) is described here.

As shown in FIG. 12, the angular velocity $\omega v$ that is the basis for determining the traveling direction has a period of one pair of steps. Therefore, the correction unit 104 obtains the amount of change in the traveling direction per pair of steps ($\Delta W$), first. $\Delta W$ can be obtained as the integrated value of $\omega v$ for the time period of one pair of steps (i.e., the walking period) by $\Delta W = \Sigma(\omega v - bv)$.

The correction unit 104 then obtains the average value $\omega v(ave)$ of $\omega v$ per measurement period Ts by $\omega v(ave) = \Delta W/$(walking period/Ts). Furthermore, the correction unit 104 updates the bias value bv so that by $+\omega v(ave)$ is used as a new bias value bv, and performs correction.

In this manner, in a case where the walking motion of the user is in the rectilinear state (Yes in Step S14), Step S15 is performed and the bias value bv of the gyro sensor 14 is corrected by the correction unit 104. Thus, after that, the angular velocity information 140 output from the gyro sensor 14 is corrected.

Please note that in a case where the traveling direction is recorded for performing a positioning process or a route recording process, it is preferable to record the amount of change in the traveling direction as "0" without referring to the angular velocity information 140 and the acceleration information 150, while the walking motion of the user is being decided to be in the rectilinear state by the rectilinear walking decision unit 103.

On the other hand, in a case of No in Step S14 (i.e., a case where the walking motion of the user is not in the rectilinear state), the correction unit 104 skips Step S15 and does not correct the bias value bv of the gyro sensor 14. Therefore, in a case where the traveling direction is recorded for performing a positioning process or a route recording process, the traveling direction is recorded based on the angular velocity information 140 and the acceleration information 150. However, the traveling direction may be calculated by obtaining $\Delta W$ by the same calculation in Step S15 and adding it.

In a case of No in Step S14 or a case where Step S15 is performed, the vector calculation unit 101 performs the representative sub-block determination process for determining a new representative sub-block (Step S16). The representative sub-block determination process in Step S16 can be performed in the same manner as that in Step S10 and therefore the description thereof is omitted.

When performing Step S16, the portable terminal device 1 returns to the monitor state again.

As described above, the portable terminal device 1 in the preferred embodiment includes: the gyro sensor 14 that measures an angular velocity in the movement of the portable terminal device 1 to acquire angular velocity information 140; the acceleration sensor 15 that measures an acceleration in the movement of the portable terminal device 1 to acquire acceleration information 150; the camera 16 that captures an image of a subject in the surroundings during a time period in which the portable terminal device 1 is moving, to acquire image information 160; the vector calculation unit 101 that calculates motion vector information 111 of the subject based on the image information 160; the correlation decision unit 102 that decides a relative relationship between the traveling direction by the walking motion of the user and the image-capturing direction of the camera in accordance with the angular velocity information 140 acquired by the gyro sensor 14 and the acceleration information 150 acquired by the acceleration sensor 15; the rectilinear walking decision unit 103 that decides whether or not the user is in the rectilinear state in the walking motion in accordance with the motion vector information 111 of the subject calculated by the vector calculation unit 101 and the correlation relation decided by the correlation decision unit 102; and the correction unit 104 that corrects the angular velocity information 140 acquired by the gyro sensor 14 in response to the decision by the rectilinear walking decision unit 103 that the user is in the rectilinear state in the walking state. Thus, it is possible to accurately decide whether or not the user is in the rectilinear state in the walking motion. Therefore, correction of the gyro sensor 14 can be performed with high accuracy.

The vector calculation unit 101 divides the image information 160 into a plurality of blocks each having the first size, divides each of the blocks into a plurality of sub-blocks each having the second size smaller than the first size, detects the edge amount for every one of the sub-blocks, determines one of the sub-blocks providing the maximum edge amount in each of the blocks as a representative sub-block of the each of the blocks, and calculates a motion vector of the determined representative sub-block, thereby calculating the motion vector information 111 of the subject. Thus, it is possible to suppress localization of the sub-blocks, for which the motion vector information 111 is calculated, in the image information. Therefore, it is possible to decide whether or not the traveling direction of the pedestrian is in the rectilinear state with high accuracy.

The vector calculation unit 101 averages the motion vector of the representative sub-block in every walking period of the user, thereby obtaining the motion vector information 111 of the subject. Thus, effects of the movement other than the movement in the traveling direction can be suppressed.

Moreover, in the walking motion of the user, the walking period is determined in accordance with a time in which the user puts each of right and left feet by one step (time period for one pair of steps), thereby processing can be performed in every period of the angular velocity around V-axis ωv and the accuracy can be improved.

The correlation relation decided by the correlation decision unit 102 includes a relation in which the image-capturing direction of the camera 16 faces the traveling direction by the walking motion of the user. Thus, the rectilinear state can be easily decided.

In a case where the image-capturing direction of the camera 16 faces the traveling direction by the walking motion of the user, the rectilinear walking decision unit 103 decides the walking motion of the user as being in the rectilinear state when the motion vectors of the subject obtained by the vector calculation unit 101 are radial in the image information 160. Thus, it is possible to decide the rectilinear state efficiently.

When the representative sub-block is determined for each block, only the representative sub-block that is the partial image of the image information 160 may be recorded, while that image information 160 may be deleted or overwritten with new image information 160 when the new image information 160 is acquired. By doing this, the capacity of the information to be recorded can be suppressed.

Moreover, when a sub-block in the peripheral portion of the image information 160 is determined as the representative sub-block, the subject corresponding to that representative sub-block may be out of the image-capturing range by the movement of the user. In this case, the motion vector may not be able to be obtained. Therefore, when the representative sub-block is determined, sub-blocks located in the peripheral portion of the image information 160 may be removed from candidates. Alternatively, it may be determined at which position a sub-block is removed from the candidate, in accordance with the expected movement of the user (the direction or the velocity).

It is described that in the portable terminal device 1 in the preferred embodiment, the motion vector of the representative sub-block is averaged in the walking period, thereby the effects of the movement other than the movement in the traveling direction is suppressed. However, a method for suppressing the effects of the movement other than the movement in the traveling direction is not limited thereto.

Figure 13:
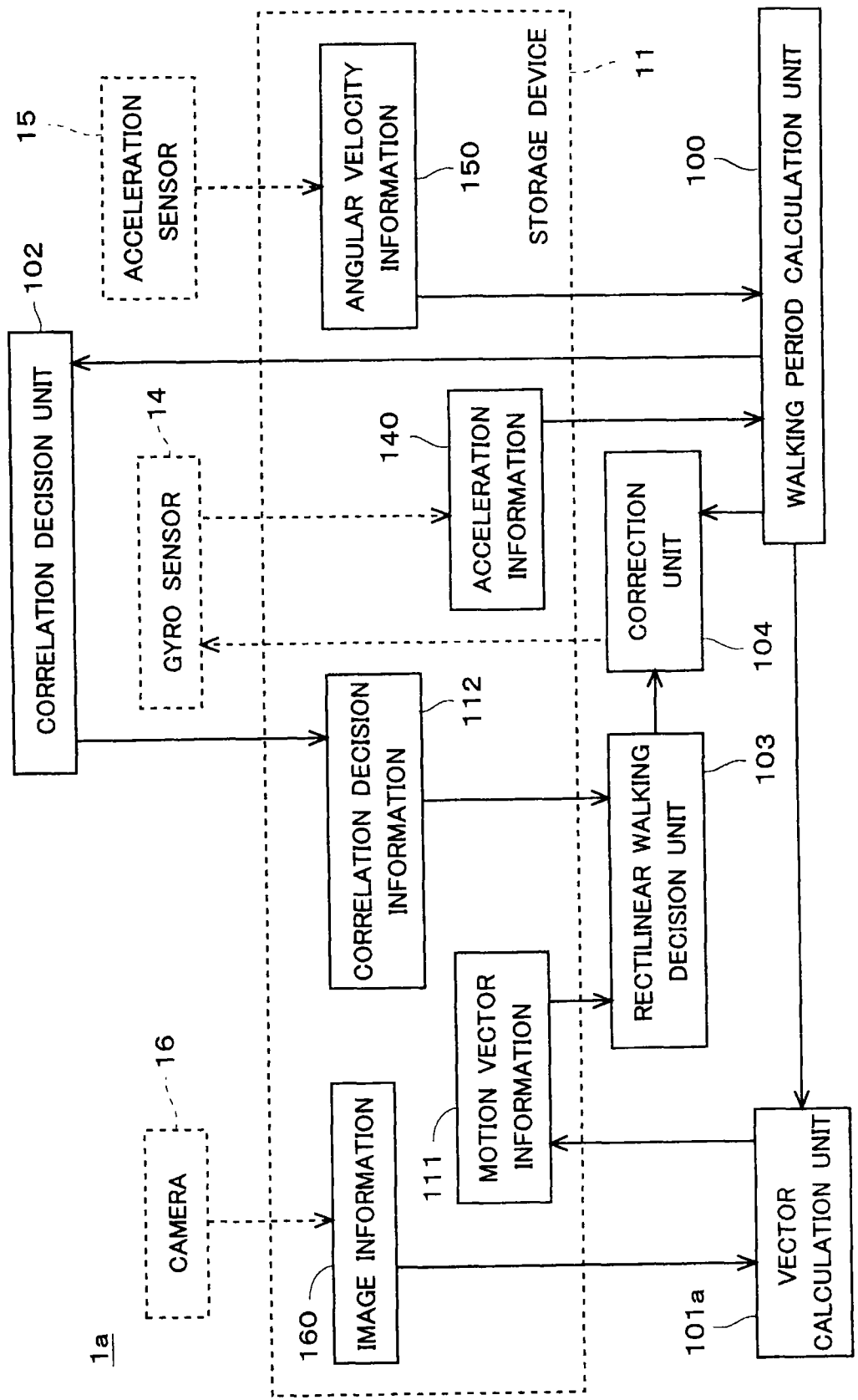
FIG. 13 shows functional blocks provided in a portable terminal device in another preferred embodiment, together with a data flow.

FIG. 13 shows functional blocks provided in a portable terminal device 1a in another preferred embodiment, together with a data flow. In the portable terminal device 1a in the other preferred embodiment, the same structures as those in the portable terminal device 1 in the preferred embodiment are labeled with the same reference signs, and the description thereof is omitted as appropriate.

As shown in FIG. 13, the portable terminal device 1a is different from the portable terminal device 1 in including a walking period calculation unit 100a in place of the walking period calculation unit 100 and including a vector calculation unit 101a in place of the vector calculation unit 101.

The walking period calculation unit 100a calculates the calculation timing in place of the walking period, and transmits it to the vector calculation unit 101a.

The vector calculation unit 101a uses the motion vector of the representative sub-block as the motion vector of the subject without averaging it in the walking period, thereby creating the motion vector information 111. Moreover, the timing of the calculation by the vector calculation unit 101a is not determined by the calculation timer, but is notified from the walking period calculation unit 100a.

Figure 14:
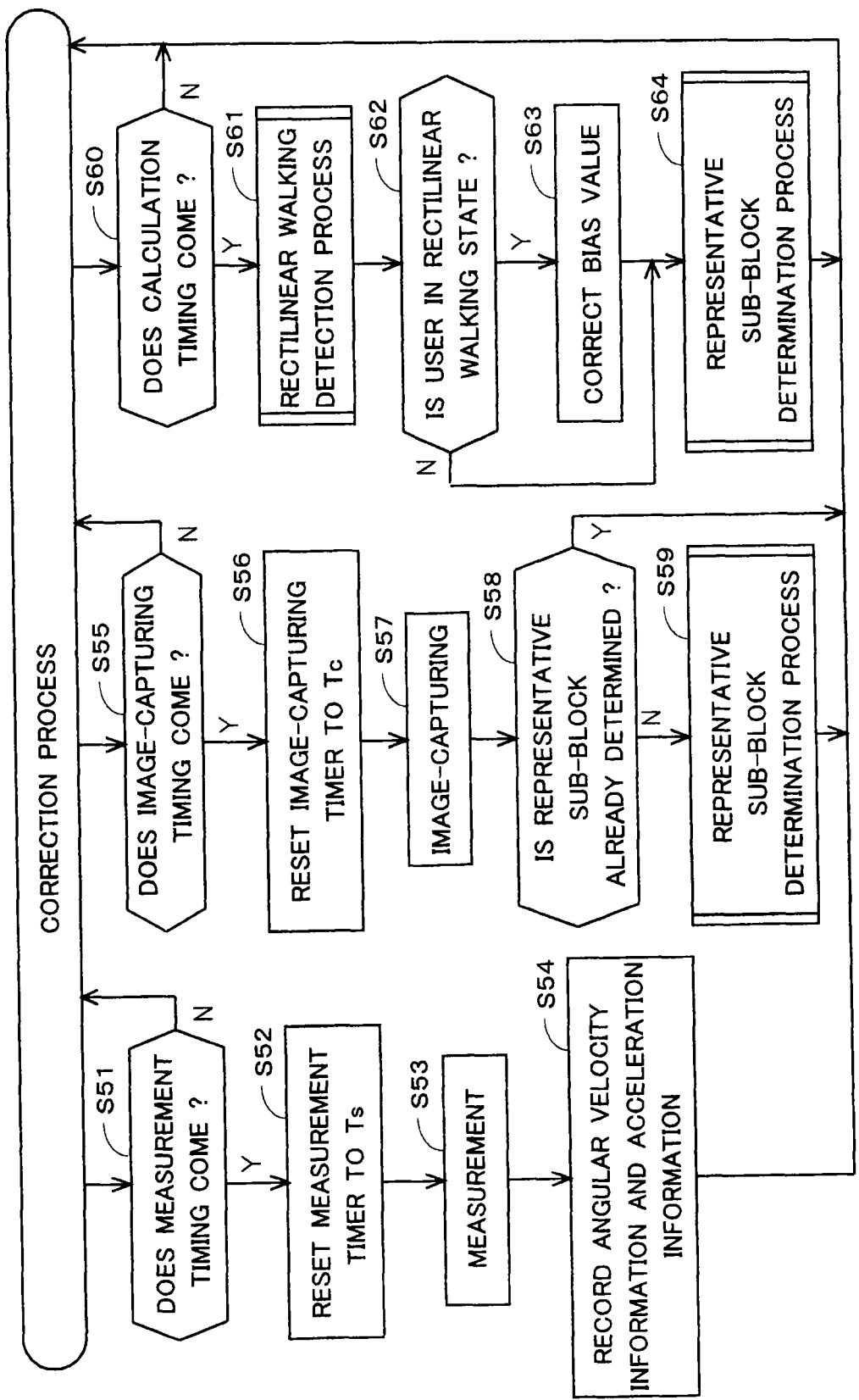
FIG. 14 is a flowchart illustrating a correction process performed by the portable terminal device in the other preferred embodiment.

FIG. 14 is a flowchart illustrating a correction process performed by the portable terminal device 1a in the other preferred embodiment.

The portable terminal device 1a in the other preferred embodiment is placed in the monitor state, after execution of the initial setting that is the same as that in the portable terminal device 1 in the preferred embodiment. In the monitor state, the portable terminal device 1a monitors arrival of the measurement timing, arrival of the image-capturing timing, and arrival of the calculation timing (Steps S51, S55, and S60).

In the monitor state, when the measurement timer Ts activated in the initial setting becomes zero, the portable terminal device 1a gives Yes as the decision result in Step S51 and performs processes from Steps S52 to S54. The processes from Steps S52 to S54 are the same as the processes from Steps S2 to S4 in the preferred embodiment, and therefore the description is omitted.

In the monitor state, when the image-capturing timer Tc activated in the initial setting becomes zero, the portable terminal device 1a gives Yes as the decision result in Step S55 and performs processes Steps S56 and S57. The processes in Steps S56 and S57 are the same as the processes in Steps S6 and S7 in the preferred embodiment, and therefore the description is omitted.

When Step S57 is performed, the vector calculation unit 101a decides whether or not the representative sub-block is already decided (Step S58). When the representative sub-block has not been decided yet, the vector calculation unit 101a performs a representative sub-clock determination process (Step S59) and the portable terminal device 1a returns to the monitor state. On the other hand, when the representative sub-block is already decided, Step S59 is skipped and the portable terminal device 1a returns to the monitor state. The representative sub-clock determination process in Step S59 is the same as the process in Step S10 in the preferred embodiment and therefore the description is omitted.

In the portable terminal device 1a, no structure corresponding to the calculation timer Tv is provided, and a process for activating the calculation timer Tv (corresponding to Step S9) is not performed.

In the monitor state, when the calculation timing comes, the CPU 10 gives Yes as the result in Step S60. In the preferred embodiment, the arrival of the calculation timing is decided by referring to the value of the calculation timer. However, in the other preferred embodiment, the calculation timer is not provided. Therefore, decision in Step S60 cannot be performed by using the value of the calculation timer.

As described before, in the walking motion, the same walking state is repeated at every walking period. Thus, by comparing plural units of the image information 160 captured in the same state with each other, the movement other than the movement in the traveling direction can be canceled efficiently. In other words, by making the calculation timing synchronized with the walking period so that the calculation timing comes at every walking period, the effects of the movement other than the movement in the traveling direction can be suppressed.

Moreover, in a case where the edge amount detection process is performed for the image information 160 and the motion vector is calculated, it is preferable that camera shake of that image information 160 is small. The camera shake is mainly generated by movement of the camera 16, and is larger as the moving velocity of the camera 16 is larger. Thus, the portable terminal device 1*a* is configured to decide that the calculation timing comes when the velocity of the camera 16 is the minimum. By this configuration, it is possible to calculate the motion vector in the image information 160 captured by the camera 16, by the image information 160 with the minimum camera shake, thus the accuracy is improved. The timing at which the velocity of the camera 16 is the minimum can be determined based on the accelerations aw, as, and ay.

From the above, the vector calculation unit 101*a* decides that the calculation timing comes at the timing at which the velocity of the camera 16 is the minimum, which comes at every walking period, and gives Yes as the decision result in Step S60. Such a timing is detected by the walking period calculation unit 100*a* and is transmitted to the vector calculation unit 101*a*.

The walking period calculation unit 100*a* in the other preferred embodiment can obtain the walking period in Step S60 in the same manner as that in Step S43 (FIG. 9) in the preferred embodiment. Moreover, since the accelerations aw, as, and av are obtained in the process for obtaining the walking period in Step S60, the timing at which the velocity of the camera 16 is the minimum can be also determined based on those accelerations. The walking period calculation unit 100*a* transmits that timing to the vector calculation unit 101*a*. In this manner, in the portable terminal device 1*a* in the other preferred embodiment, arrival of the calculation timing is detected.

In a case of Yes in Step S60, the portable terminal device 1*a* performs a rectilinear walking detection process (Step S61).

Figure 15:
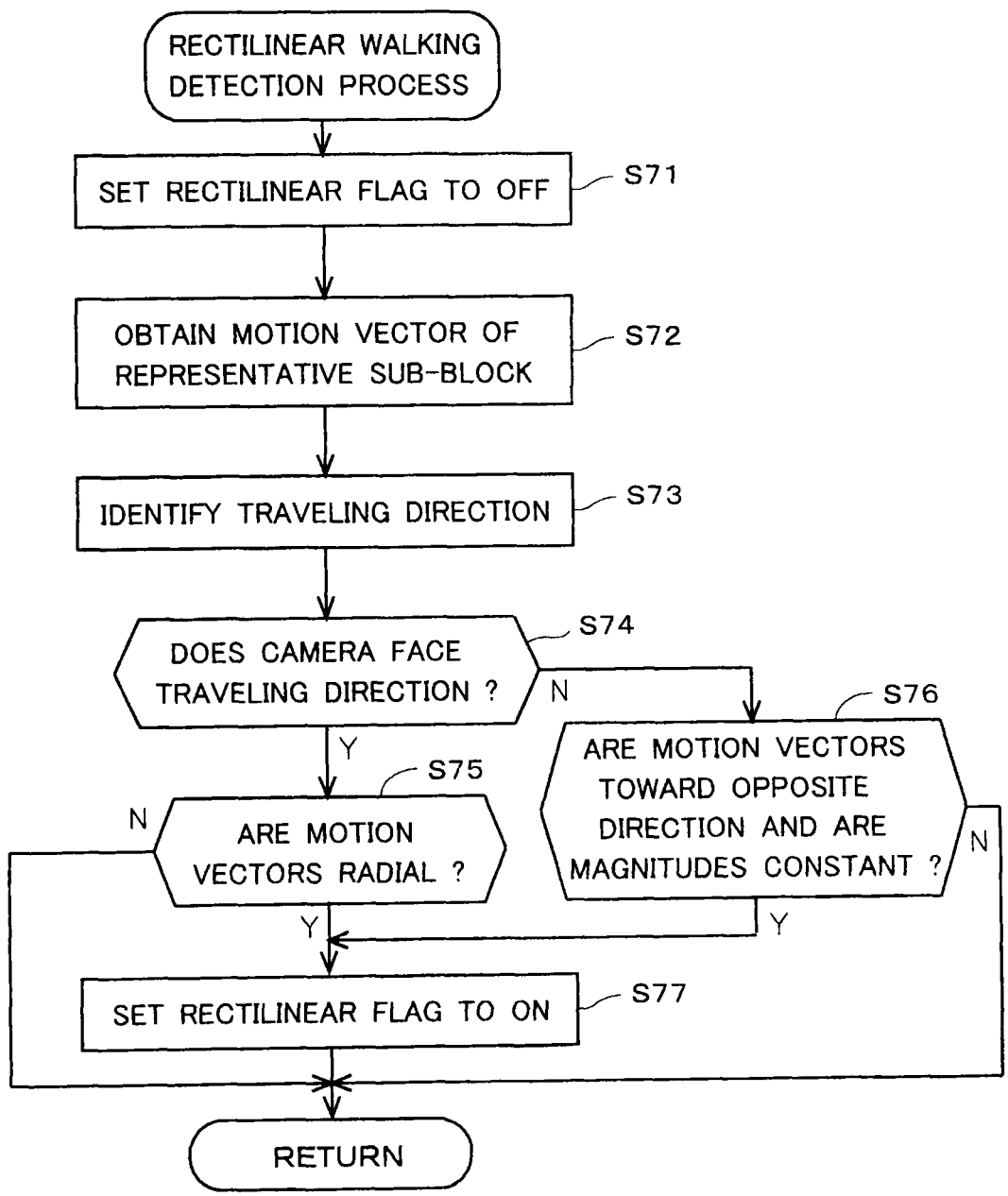
FIG. 15 is a flowchart illustrating a rectilinear walking detection process in the other preferred embodiment.

FIG. 15 is a flowchart illustrating the rectilinear walking detection process in the other preferred embodiment.

When the rectilinear walking detection process is started, the rectilinear walking decision unit 103 sets the rectilinear flag to OFF (Step S71). The vector calculation unit 101*a* then obtains the motion vector of the representative sub-block, creates the motion vector information 111, and stores the motion vector information 111 in the storage device 11 (Step S72).

In other words, because the process for obtaining the walking period is already performed in Step S60 in the other preferred embodiment, a process corresponding to Step S43 in the preferred embodiment is not performed in the other preferred embodiment.

Moreover, because the motion vector of the representative sub-block is calculated in synchronization with the walking period, the effects of the movement other than the movement in the traveling direction is already canceled. Therefore, it is unnecessary to average the motion vector of the representative sub-block in the walking period, and a process corresponding to Step S44 in the preferred embodiment is not performed in the other preferred embodiment. The motion vector of the representative sub-block obtained in Step S72 is then stored in the motion vector information 111 as the motion vector of the subject as it is.

When Step S72 is performed, the portable terminal device 1*a* performs Step S73. The processes from Steps S73 to S77 are the same as those in Steps S45 to S49 in the preferred embodiment, and therefore the description thereof is omitted.

When finishing the rectilinear walking process in Step S61, the portable terminal device 1*a* performs Step S62. The processes after Step S62 is performed are the same as those after Step S14 is performed in the preferred embodiment, and therefore the description thereof is omitted.

As described above, the portable terminal device 1*a* in the other preferred embodiment, the vector calculation unit 101*a* calculates the motion vector of the representative sub-block at the calculation timing synchronized with the walking period of the user. Thus, without performing averaging in the walking period, it is possible to remove the effects of the movement other than the movement in the traveling direction.

Moreover, the calculation timing is determined to be the time at which the velocity of the camera 16 is the minimum. Therefore, while the effects of the movement other than the movement in the traveling direction can be suppressed, shake of the image information 160 can be also suppressed.

The calculation timing may be determined to be the time at which both feet of the user are on the ground. In this case, the motion vector at the instant at which the body of the user is the most stable. Therefore, the effects of the movement other than the movement in the traveling direction can be also suppressed. The time at which both feet of the user are on the ground can be detected by the walking period calculation unit 100*a* based on the angular velocities ωw, ωs, and ωv and the accelerations aw, as, and ay.

As a method for making the calculation timing synchronized with the walking period, synchronization can be achieved by setting the walking period calculated by the walking period calculation unit 100*a* in the structure the same as the calculation timer in the preferred embodiment and monitoring arrival of the timing at which the calculation timer becomes zero in Step S60.

Moreover, in the other preferred embodiment, the calculation period of vector calculation is relatively long because the vector calculation is performed in synchronization with the walking period. Therefore, the amount of move of the subject contained in the representative sub-block within the image may increase, thus widening an area in which the representative sub-block is searched. However, because the portable terminal device 1*a* can estimate the amount of move of the representative sub-block within the image based on the angular velocities ωw, ωs, and ωv and the accelerations aw, as, and av, the above problem can be suppressed. This is the same in still another preferred embodiment described below.

A method for suppressing the effects of the movement other than the movement in the traveling direction is not limited to the ones described in the preferred embodiment and the other preferred embodiment.

Figure 16:
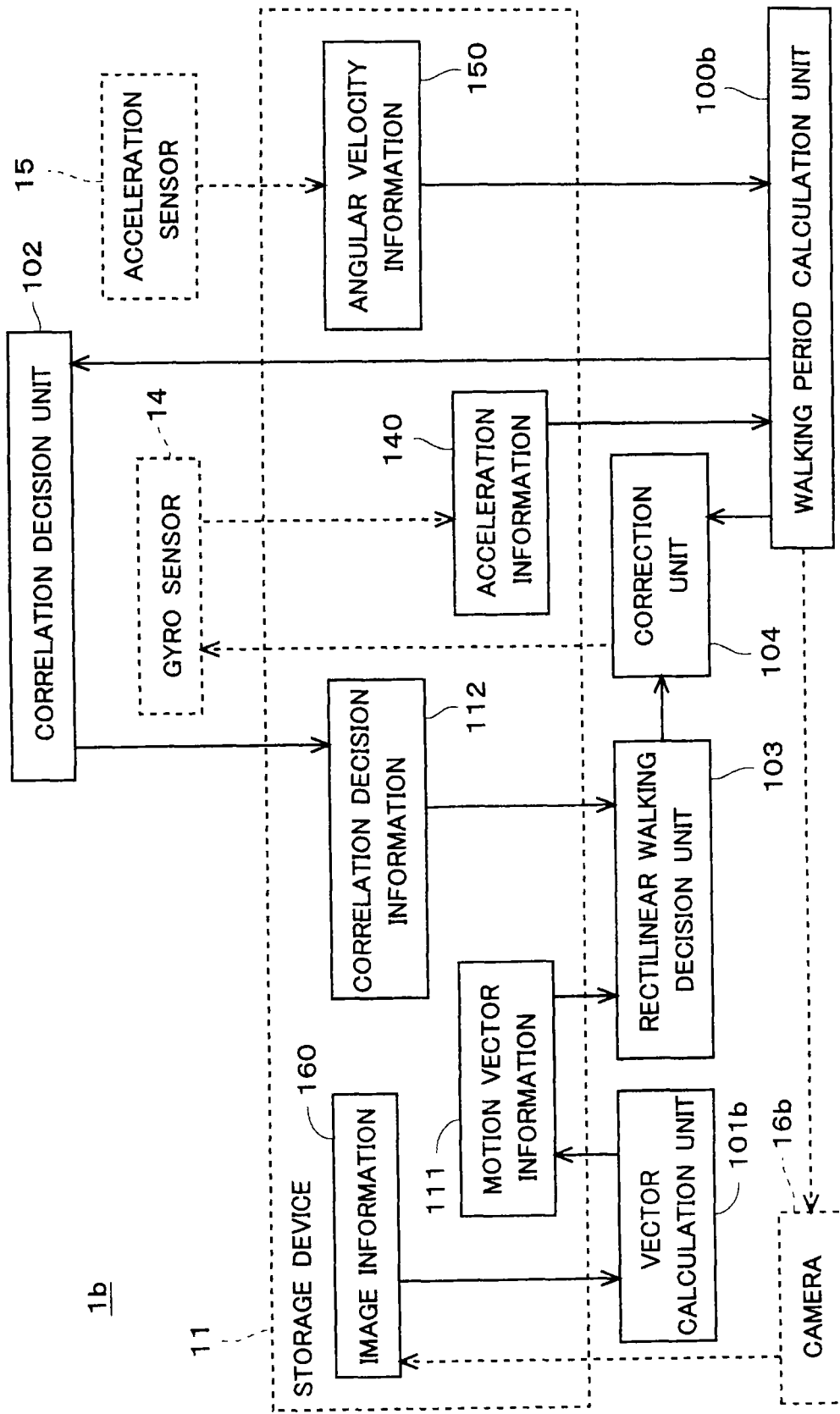
FIG. 16 shows functional blocks provided in a portable terminal device in still another preferred embodiment, together with a data flow.

FIG. 16 shows functional blocks provided in a portable terminal device 1*b* in still another preferred embodiment, together with a data flow. In the portable terminal device 1*b* in the still other preferred embodiment, the same structures as those in the portable terminal device 1 in the preferred embodiment are labeled with the same reference signs, and the description thereof is omitted as appropriate.

As shown in FIG. 16, the portable terminal device 1*b* is different from the portable terminal device 1 in including a camera 16*b* in place of the camera 16, including a walking period calculation unit 100*b* in place of the walking period calculation unit 100, and including a vector calculation unit 101*b* in place of the vector calculation unit 101.

The camera 16*b* performs image capturing in accordance with the image-capturing timing notified from the walking period calculation unit 100*b* to acquire image information 160.

The walking period calculation unit 100*b* calculates the walking period based on the angular velocity information 140 and the acceleration information 150, determines the image-capturing timing in synchronization with the walking period, and transmits the image-capturing timing to the camera 16*b*. On the other hand, the walking period calculation unit 100*b* does not transmit the walking period to the vector calculation unit 101*b*.

The vector calculation unit 101*b* does not determine the calculation timing by the calculation timer, but performs calculation of the motion vector by using the timing of acquisition of new image information 160 as the calculation timing.

Figure 17:
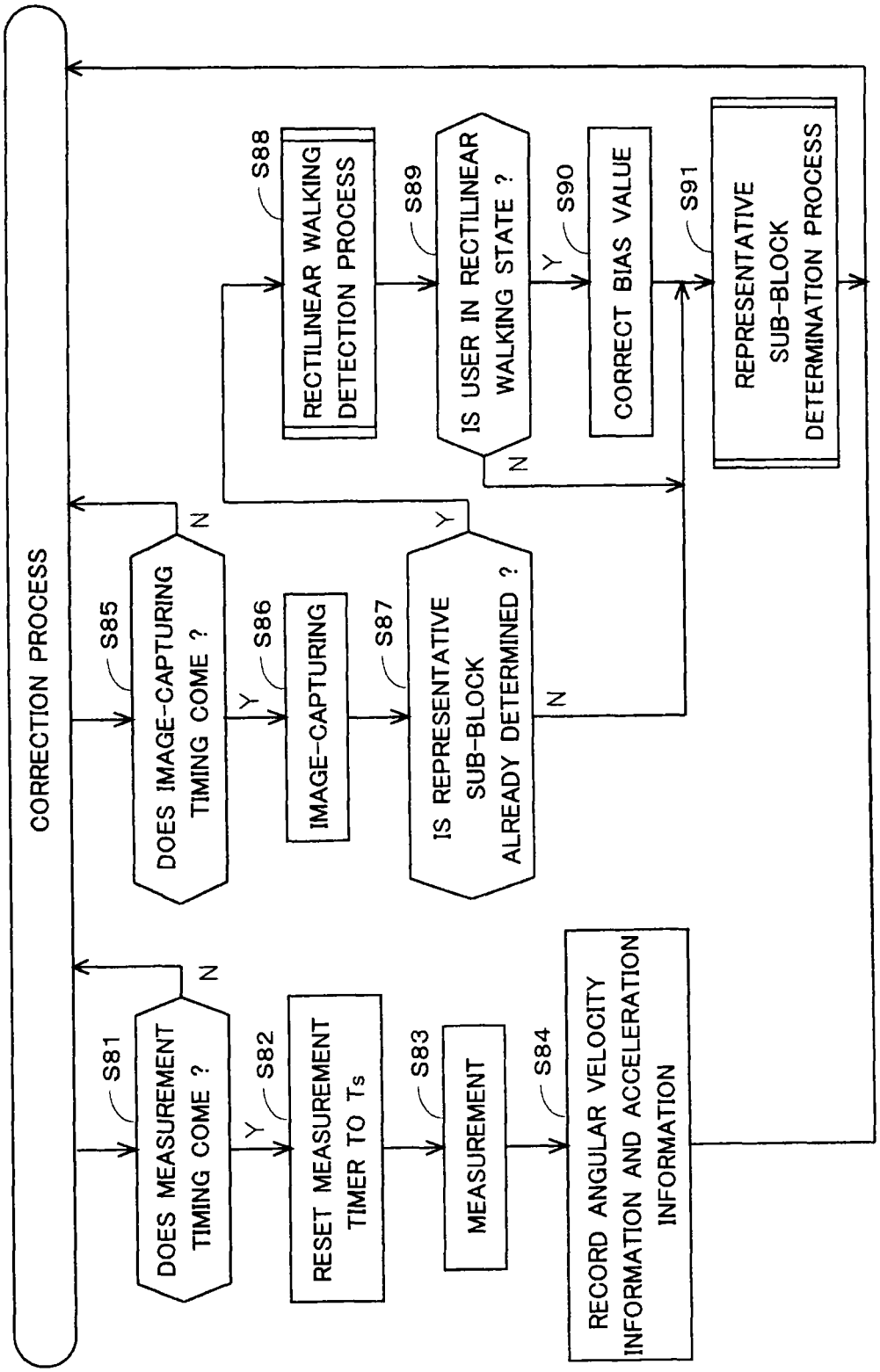
FIG. 17 is a flowchart illustrating a correction process performed by the portable terminal device in the still other preferred embodiment.

FIG. 17 is a flowchart illustrating a correction process performed by the portable terminal device 1*b* in the still other preferred embodiment.

The portable terminal device 1*b* in the still other preferred embodiment is also placed in the monitor state, after the initial setting that is the same as that in the portable terminal device 1 in the preferred embodiment is performed. However, that initial setting does not contain the process for activating the image-capturing timer because the image-capturing timer is not included in the portable terminal device 1*b*. In the monitor state, the portable terminal device 1*b* monitors arrival of the measurement timing and arrival of the image-capturing timing (Steps S81 and S85).

In the monitor state, when the measurement timer Ts activated in the initial setting becomes zero, the portable terminal device 1*b* gives Yes as the result in the decision in Step S81 and performs processes from Steps S82 to S84. The processes from Steps S82 to S84 are the same as the processes from Steps S2 to S4 in the preferred embodiment, and therefore the description is omitted.

In the monitor state, when the image-capturing timing comes, the portable terminal device 1*b* gives Yes as the result in the decision in Step S85. While the arrival of the image-capturing timing is decided by referring to the value of the image-capturing timer in the preferred embodiment, the decision in Step S85 cannot be performed by the value of the image-capturing timer in the still other preferred embodiment because the image-capturing timer is not provided.

As described in the other preferred embodiment, in the walking motion, the same walking state is repeated at every walking period. Thus, by comparing plural units of the image information 160 captured in the same state with each other, the movement other than the movement in the traveling direction can be canceled efficiently. In other words, by making the image-capturing timing synchronized with the walking period so that the image-capturing timing comes at every walking period, only the image information 160 captured in the same state can be obtained and the effects of the movement other than the movement in the traveling direction can be suppressed.

Moreover, in a case where the edge amount detection process is performed for the image information 160 and the motion vector is calculated, it is preferable that camera shake of that image information 160 is small, as already described in the other preferred embodiment. Therefore, the portable terminal device 1*b* is configured to decide that the image-capturing timing comes when the velocity of the camera 16 is the minimum. By this configuration, in the image information 160 captured by the camera 16, it is possible to calculate the motion vector by the image information 160 with the minimum camera shake as in the other preferred embodiment, thus the accuracy is improved.

In other words, while the portable terminal device 1*a* is configured to calculate the motion vector by using the image information 160 at the most appropriate timing by adjusting the calculation timing, the portable terminal device 1*b* is configured to capture the image information 160 at the most appropriate timing only. This can largely reduce the number of image capturing by the camera 16*b*, thus the processing load can be reduced and the power consumption can be also suppressed.

From the above, the portable terminal device 1*b* decides that the image-capturing timing comes at the timing at which the velocity of the camera 16*b* is the minimum, which comes at every walking period, and gives Yes as the result in decision in Step S85. Such a timing is detected by the walking period calculation unit 100*b* in the same manner as that in the walking period calculation unit 100*a* in the other preferred embodiment, and is transmitted to the camera 16*b*.

In a case of Yes in Step S85, the camera 16*b* performs image capturing, and new image information 160 is stored in the storage device 11 (Step S86).

When the new image information 160 is stored, the vector calculation unit 101*b* decides whether or not the representative sub-block is already decided (Step S87). When the representative sub-block is not decided yet (No in Step S87), the vector calculation unit 101*b* performs a representative sub-clock determination process (Step S91) and the portable terminal device 1*b* returns to the monitor state. The representative sub-block determination process in Step S91 is the same as the process in Step S10 in the preferred embodiment and therefore the description thereof is omitted.

On the other hand, when the representative sub-block is already decided (Yes in Step S87), the CPU 10 performs the rectilinear walking detection process (Step S88). The rectilinear walking detection process in Step S88 is the same as the rectilinear walking detection process in the other preferred embodiment (FIG. 15) and therefore the description thereof is omitted.

When finishing the rectilinear walking detection process in Step S88, the portable terminal device 1*b* performs Step S89. The processes after Step S89 is performed are the same as those after Step S14 is performed in the preferred embodiment, and therefore the description thereof is omitted.

As described above, the portable terminal device 1*b* in the still other preferred embodiment, the camera 16*b* captures an image of the subject in the surroundings during a time period in which the portable terminal device 1*b* is moving, at the image-capturing timing synchronized with the walking period of the user. Thus, the image capturing is performed at a certain posture in the walking motion (variations in the posture at the image capturing can be suppressed), and it is therefore possible to remove the effects of a motion vector other than the movement in the traveling direction. Moreover, since the image-capturing is performed intermittently, the power consumption by the camera 16*b* can be suppressed.

In addition, the image-capturing timing is determined to be the time at which the velocity of the camera 16*b* is the minimum. Therefore, while the effects of the movement other than the movement in the traveling direction can be suppressed, shake of the image information 160 can be also suppressed.

The image-capturing timing may be determined to be the time at which both feet of the user are on the ground. In this case, the motion vector at the instant at which the body of the user is the most stable. Therefore, the effects of the movement other than the movement in the traveling direction can be also suppressed. The time at which both feet of the user are on the ground can be detected by the walking period calculation unit 100b based on the angular velocities ωw, ωs, and ωv and the accelerations aw, as, and ay.

As a method for making the image-capturing timing synchronized with the walking period, synchronization can be achieved by setting the walking period calculated by the walking period calculation unit 100b in the structure the same as the image-capturing timer in the preferred embodiment and monitoring arrival of the timing at which the image-capturing timer becomes zero in Step S85.

The camera 16b may be configured to perform image capturing during a fixed time period before and after the arrival of the timing that is synchronized with the walking period, and use the image information 160 actually captured when the velocity of the camera 16b is the minimum among the image information 160 acquired in that fixed time period to calculate the motion vector. The walking motion of a person does not have a fixed walking period, but has some variations. Therefore, in some cases, the same state does not actually come at the expected walking period, and the states may not be the same only based on the image information 160 captured at the expected walking period. However, by the above configuration, the motion vector can be calculated by using the image information 160 in the same state while it is decided whether or not the states are actually the same. Thus, the accuracy is improved.

In all the above-described preferred embodiments, examples are described in which the rectilinear state in the walking state of the user is decided by analysis of the image information 160 captured by the camera 16, 16b. However, a method for deciding the rectilinear state in the walking state of the user is not limited thereto.

Figure 18:
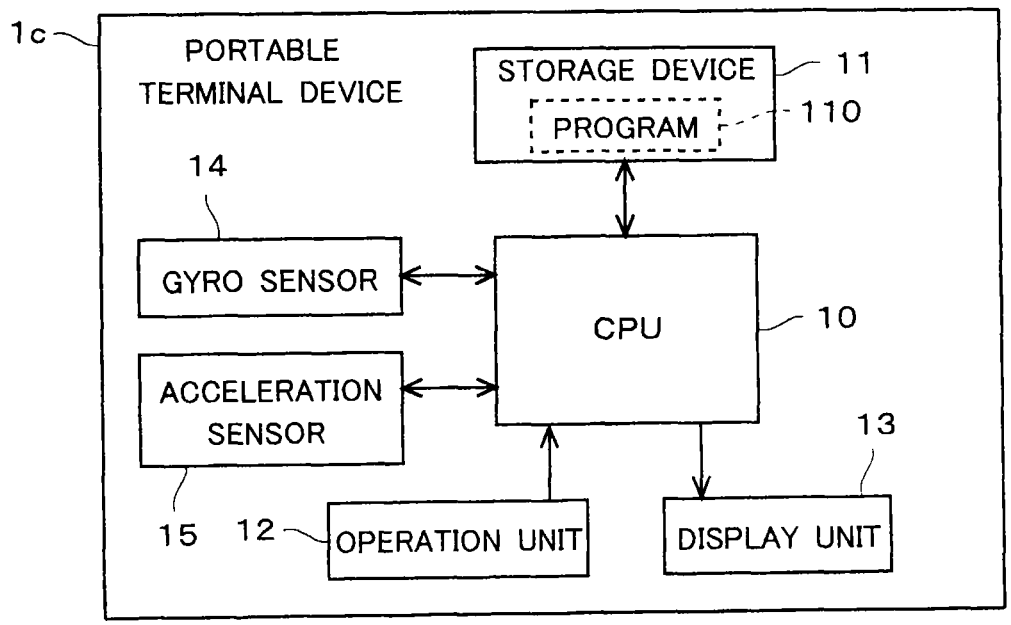
FIG. 18 is a block diagram of a portable terminal device in further another preferred embodiment.

FIG. 18 is a block diagram of a portable terminal device 1c in further another preferred embodiment. In the portable terminal device 1c in the further other preferred embodiment, the same structures as those in the portable terminal device 1 in the preferred embodiment are labeled with the same reference signs, and the description thereof is omitted as appropriate. As is apparent from comparison of FIG. 3 and FIG. 18, the portable terminal device 1c is different from the portable terminal device 1 in not including the camera 16.

Figure 19:
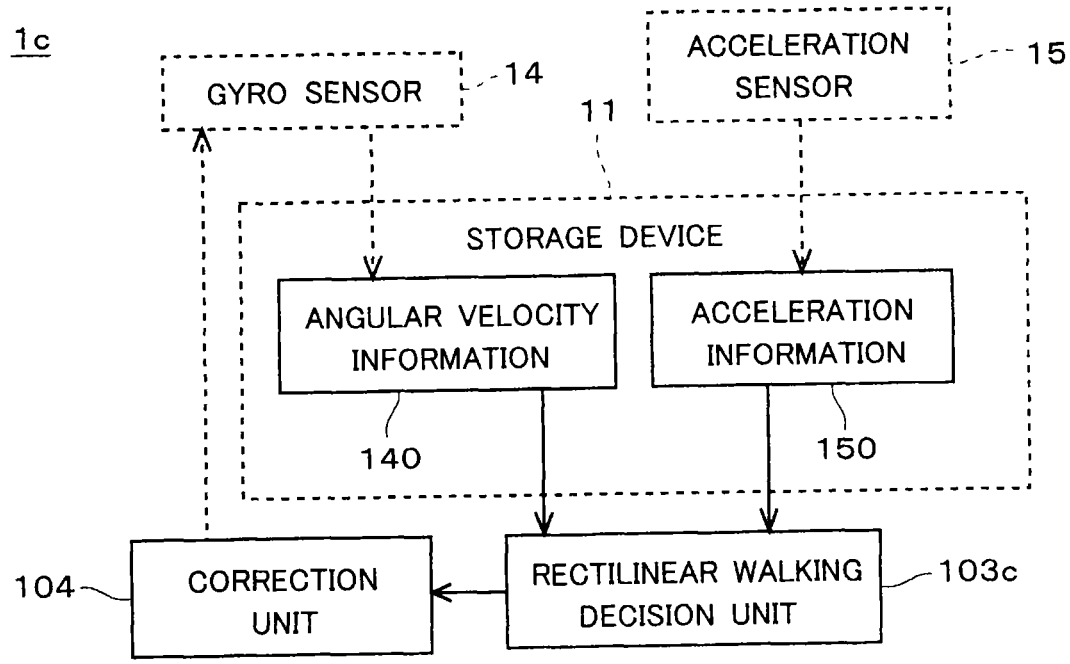
FIG. 19 shows functional blocks provided in the portable terminal device in the further other preferred embodiment, together with a data flow.

FIG. 19 shows functional blocks provided in the portable terminal device 1c in the further other preferred embodiment, together with a data flow.

The portable terminal device 1c includes a rectilinear walking decision unit 103c and the correction unit 104. The rectilinear walking decision unit 103c and the correction unit 104 are functional blocks achieved by the operation of the CPU 10 in accordance with the program 110.

The rectilinear walking decision unit 103c compares the angular velocity information acquired by the gyro sensor 14 and the acceleration information 150 acquired by the acceleration sensor 15 with a pattern in the walking motion which is provided in advance, thereby deciding whether or not the user is in the rectilinear state in the walking motion.

The rectilinear walking decision unit 103c has a function of converting the angular information 140 and the acceleration information 150 to the coordinate system representing the walking motion of the user (W-axis, S-axis, and V-axis) and obtaining the angular velocities ωw, ωs, and ωv and the accelerations aw, as, and av, like the walking period calculation unit 100 in the preferred embodiment. Also, the rectilinear walking decision unit 103c has a function of calculating the walking period based on those values.

On the accelerations aw and av and the angular velocity ωs, advancing in the walking activity is reflected. On the angular velocities ωw and ωv and the acceleration as, turning in the walking activity is reflected. Moreover, as already shown in FIG. 12, the accelerations aw and av have a period of one step, whereas the angular velocity ωv has a period of one pair of steps.

Therefore, the function of the rectilinear walking decision unit 103c can be achieved by extracting a feature point for every pair of steps with respect to a pattern in the walking motion, for which the walking state is known in advance, and inputting the extracted feature point into a machine learning machine (e.g., a support vector machine or a neural network) and making the machine learning machine perform learning. That is, also in the further other preferred embodiment, the walking period is the period of one pair of steps.

As the pattern of the walking state to be learned, straight-advancing, right turning, and left turning can be considered, for example. Moreover, as the pattern of the walking state to be learned, patterns for which carried states are different can be considered. For example, a state in which the portable terminal device 1c is carried by hand (while the hand is being shaken), a state in which the display unit 13 is seen, a state in which the portable terminal device 1c is in a pocket or the like, a state in which the portable terminal device 1c is being used for calling, and like can be considered.

Figure 20:
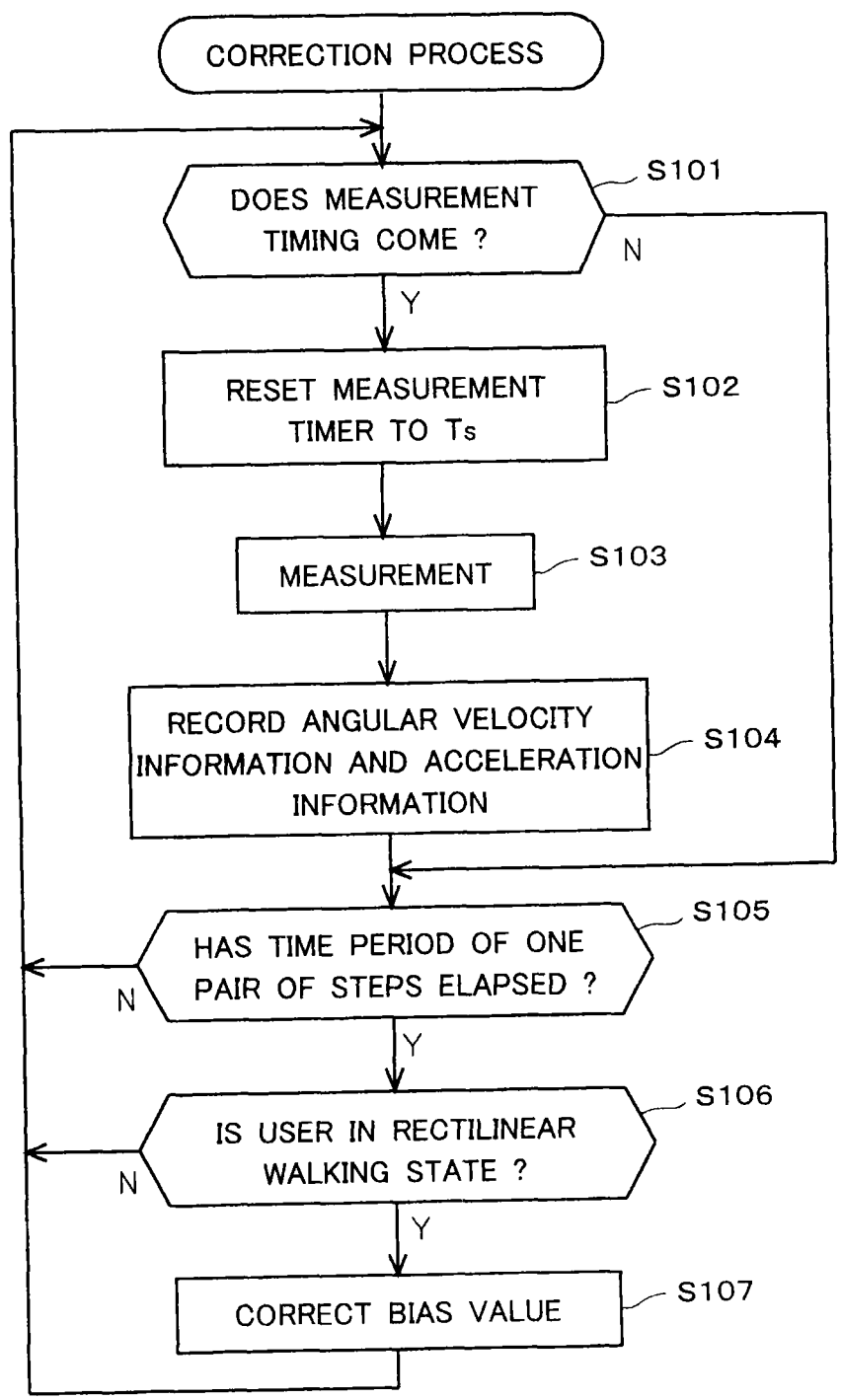
FIG. 20 is a flowchart illustrating a correction process performed by the portable terminal device in the further other preferred embodiment.

FIG. 20 is a flowchart illustrating a correction process performed by the portable terminal device 1c in the further other preferred embodiment.

It is assumed that before the start of the process shown in FIG. 20, the process for making the portable terminal device 1c learn the feature point of the pattern in the known walking motion of the user carrying the portable terminal device 1c and a predetermined initial setting have been already performed in the portable terminal device 1c. The initial setting contains the process of setting Ts in the measurement timer for measuring the timing of the measurement by the gyro sensor 14 and the acceleration sensor 15 and activating the measurement timer, and the process of setting the initial value of the bias value (bv) of the gyro sensor 14, and a process of determining the posture of the portable terminal device 1c (the posture at the start of the process). As a method for determining the initial posture of the portable terminal device 1c, a method in which the user operates the operation unit 12 of the portable terminal device 1c to input the posture and a method of determining the posture by the output of a magnetic sensor that is not shown can be considered, for example.

When finishing the initial setting, the portable terminal device 1c is placed in a state in which it monitors the measurement timer and whether or not the time of one pair of steps has passed (Steps S101 and S105). This state is referred to as a "monitor state" in the following description. In the monitor state, however, the portable terminal device 1c may perform a process other than Steps S101 and S105.

In the monitor state, when the measurement timer becomes zero and the measurement timing comes, the CPU 10 gives Yes as the result in the decision in Step S101, resets the measurement timer to Ts (Step S102), and reads out the values of the gyro sensor 14 and the acceleration sensor 15.

Thus, measurement of the angular velocity and the acceleration related to the movement of the portable terminal device 1c is performed (Step S103).

The value of the gyro sensor 14 read out in Step S103 is acquired based on the initial value of the bias value bv, when correction of the bias value bv (detailed later) has not yet been performed. On the other hand, after the correction of the bias value bv is performed, the value of the gyro sensor 14 is acquired as a value corrected with the corrected bias value bv. That is, the correction unit 104 corrects the angular velocity information 140 by correcting the bias value bv of the gyro sensor 14.

The CPU 10 then creates the angular velocity information 140 and the acceleration information 150 based on the read values of the gyro sensor 14 and the acceleration sensor 15, and records them in the storage device 11 (Step S104). In the further other preferred embodiment, the angular velocity information 140 and the acceleration information 150 are not overwritten onto the past record, but are recorded to form a history in the order of acquisition.

In this manner, the portable terminal device 1c gives Yes as the result in the decision in Step S101 every time the value of the measurement timer becomes zero, and executes the processes from Step S102 to S104. Therefore, in the portable terminal device 1c, the angular velocity and the acceleration are measured at every measurement period Ts. When executing Step S104, the portable terminal device 1c returns to the monitor state again.

In the monitor state, in a case where the time of one pair of steps has passed (Yes in Step S105), the rectilinear walking decision unit 103c decides whether or not the walking state of the user is the rectilinear state (Step S106). In the further other preferred embodiment, the decision in Step S105 gives Yes as the decision result every time the time of one pair of step elapses. Therefore, the portable terminal device 1c (rectilinear walking decision unit 103c) performs, at every walking period, pattern recognition processing based on the angular velocity information 140 and the acceleration information 150 measured during that period, and decides whether or not the walking state of the user during that period is the rectilinear state.

When the walking state of the user is the rectilinear state (Yes in Step S106), the correction unit 104 corrects the bias value of the gyro sensor 14 (Step S107). The principle in which the correction unit 104 corrects the bias value of the gyro sensor 14 in Step S107 is the same as that in Step S15 in the preferred embodiment, and therefore the description is omitted.

Also in the portable terminal device 1c, in a case where the traveling direction is recorded for performing a positioning process or a route recording process, it is preferable to record the amount of change in the traveling direction as "0" without referring to the angular velocity information 140 and the acceleration information 150, while the walking motion of the user is decided to be in the rectilinear state by the rectilinear walking decision unit 103c.

On the other hand, in a case of No in Step S106 (i.e., a case where the walking motion of the user is not in the rectilinear state), the correction unit 104 skips Step S107 and returns to the monitor state. In this case, the correction unit 104 does not correct the bias value bv of the gyro sensor 14. Therefore, in a case where the traveling direction is recorded for performing a positioning process or a route recording process, the traveling direction is recorded based on the angular velocity information 140 and the acceleration information 150. However, the traveling direction may be calculated by obtaining ΔW by the same calculation in Step S15 and adding it.

As described above, the portable terminal device 1c in the further other preferred embodiment includes: the gyro sensor 14 that measures the angular velocity in the movement of the portable terminal device 1c to acquire the angular velocity information 140; the acceleration sensor 15 that measures the acceleration in the movement of the portable terminal device 1c to acquire the acceleration information 150; the rectilinear walking decision unit 103c that compares the angular velocity information 140 acquired by the gyro sensor 14 and the acceleration information 150 acquired by the acceleration sensor 15 with a pattern in a walking motion that is given in advance, to decide whether or not the user is in the rectilinear state in the walking motion; and the correction unit 104 that corrects the angular velocity information 140 acquired by the gyro sensor 14 in response to decision by the rectilinear walking decision unit 103c that the user is in the rectilinear state in the walking state. Thus, it is possible to accurately decide whether or not the user is in the rectilinear state in the walking motion.

The rectilinear walking decision unit 103c performs the comparison with the pattern in accordance with the walking period in the walking motion of the user. That is, by dividing the walking motion formed as a continuous motion into motions between the walking periods and focusing on those motions, efficient extraction of the feature point can be performed, and pattern recognition can be performed by the motion in a relatively short time. Therefore, it is possible to use the pattern recognition for the walking motion that is the continuous motion in a relatively long time, and is also possible to improve the accuracy of detection of the rectilinear state. Moreover, unlike the first to still other preferred embodiments, it is not necessary to provide the camera 16 or 16b.

Moreover, the walking period is determined in accordance with a time in which the user puts each of right and left feet by one step in the walking motion of the user (i.e., the time of one pair of steps). Thus, the walking period can be coincident with the period of the angular velocity ωv, and therefore the accuracy can be improved as compared with a case where the walking period is the time of one step.

In the above description, various preferred embodiments of the present invention have been described. However, the present invention is not limited to the above-described preferred embodiments, but can be modified in various ways.

For example, the respective steps shown in the above-described preferred embodiment are mere examples, and the order and the contents thereof are not limited to those described above. That is, the order or the contents can be changed as appropriate, as long as the same effects can be obtained.

The functional blocks (the walking period calculation unit 100, the vector calculation unit 101, and the like) shown in the above-described preferred embodiments are described as being achieved in form of software by the operation of the CPU 10 in accordance with the program 110. However, a portion or all of those functional blocks may be formed by dedicated logic circuits to be achieved by hardware.

Although a magnetic sensor is not used in the above-described preferred embodiment, it may be provided as a self-contained sensor for achieving relative positioning.

The invention claimed is:

1. A portable terminal device carried by a user comprising:
   circuitry including at least a camera, sensors, and a memory, the circuitry configured to:
   acquire, from one of the sensors, angular velocity information regarding an angular velocity in movement of the portable terminal device;
   measure an acceleration in the movement of the portable terminal device to acquire acceleration information;

capture an image of a subject in surroundings during a time period in which the portable terminal device is moving, to acquire image information;
calculate a motion vector of the subject based on the image information;
decide a relative relation between a traveling direction by a walking motion of the user and an image-capturing direction of the camera in accordance with the angular velocity information and the acceleration information acquired;
decide whether the user is in a rectilinear state in the walking motion in accordance with the motion vector of the subject calculated and the relative relation decided;
correct the angular velocity information outputted from the one of the sensors in response to the decision that the user is in the rectilinear state in the walking motion; and
output, to the user walking toward a destination, guiding information based on the corrected angular velocity information, wherein
the circuitry is further configured to:
divide the image information into a plurality of blocks each having a first size;
divide each of the blocks into a plurality of sub-blocks each having a second size smaller than the first size;
detect an edge amount for every one of the sub-blocks;
determine one of the sub-blocks providing a maximum edge amount in each of the blocks as a representative sub-block of the each of the blocks;
calculate a motion vector of the determined representative sub-block, thereby calculating the motion vector of the subject; and
calculate the motion vector of the representative sub-block at a calculation timing synchronized with a walking period of the user.

2. The portable terminal device according to claim 1, wherein
a timing at which a velocity of the camera is the minimum, which comes at every walking period, is determined in accordance with the acceleration information acquired by the one of the sensors of the circuitry, and
the calculation timing is determined as the timing at which the velocity of the camera is the minimum.

3. The portable terminal device according to claim 1, wherein
the calculation timing is determined as a time at which both feet of the user are on the ground.

4. The portable terminal device according to claim 1, wherein
the camera captures the image of the subject in the surroundings during the time period in which the portable terminal device is moving, at an image-capturing timing synchronized with a walking period of the user.

5. The portable terminal device according to claim 4, wherein
a timing at which a velocity of the camera is the minimum, which comes at every walking period, is determined in accordance with the acceleration information acquired by the one of the sensors of the circuitry, and
the image-capturing timing is determined as the timing at which the velocity of the camera is the minimum.

6. The portable terminal device according to claim 4, wherein
the image-capturing timing is determined as a time at which both feet of the user are on the ground.

7. The portable terminal device according to claim 1, wherein
the walking period is determined in accordance with a time in which the user puts each of right and left feet by one step in the walking motion of the user.

8. The portable terminal device according to claim 1, wherein
the relative relation includes a relation in which the image-capturing direction of the camera faces the traveling direction by the walking motion of the user.

9. The portable terminal device according to claim 8, wherein
in a case where the image-capturing direction of the camera faces the traveling direction by the walking motion of the user, the circuitry is further configured to decide the walking motion of the user as being in the rectilinear state when the motion vectors of the subject obtained by the circuitry are radial in the image information.

10. The portable terminal device according to claim 1, wherein
the one of the sensors is a gyro sensor, and
the circuitry is configured to correct the angular velocity information by correcting a bias value of the gyro sensor.

11. A portable terminal device carried by a user comprising:
circuitry including at least a camera, sensors, and a memory, the circuitry configured to:
acquire, from one of the sensors, angular velocity information regarding an angular velocity in movement of the portable terminal device;
measure an acceleration in the movement of the portable terminal device to acquire acceleration information;
cause learning of a feature point of a pattern in a known walking motion of the user carrying the portable terminal device;
compare the angular velocity information acquired and the acceleration information acquired with the feature point of the pattern;
decide whether the user is in a rectilinear state in the walking motion based on the comparison;
correct the angular velocity information outputted from the one of the sensors in response to the decision that the user is in the rectilinear state in the walking motion; and
output, to the user walking toward a destination, guiding information based on the corrected angular velocity information.

12. The portable terminal device according to claim 11, wherein the circuitry is further configured to perform the comparison with the pattern in accordance with a walking period in the walking motion of the user.

13. The portable terminal device according to claim 12, wherein the walking period is determined in accordance with a time in which the user puts each of right and left feet by one step in the walking motion of the user.

14. The portable terminal device according to claim 11, wherein
the circuitry is configured not to correct the angular velocity information outputted from the one of the sensors in response to the decision that the user is not in the rectilinear state in the walking motion.

15. A non-transitory computer-readable storage medium storing computer-readable instructions that, when executed by a computer, cause the computer to perform a method for guiding a user using a portable terminal device comprising circuitry including at least a camera, sensors, and a memory, the method comprising:
- acquiring, from one of the sensors, angular velocity information regarding an angular velocity in movement of the computer;
- measuring an acceleration in the movement of the computer by the circuitry to acquire acceleration information;
- capturing an image of a subject in surroundings by the camera during a time period in which the computer is moving, to acquire image information;
- calculating a motion vector of the subject based on the image information acquired by the camera;
- deciding a relative relation between a traveling direction by a walking motion of the user and an image-capturing direction of the camera in accordance with the angular velocity information and the acceleration information acquired by the circuitry;
- deciding whether the user is in a rectilinear state in the walking motion in accordance with the calculated motion vector of the subject and the relative relation;
- correcting the angular velocity information outputted from the one of the sensors in response to the decision that the user is in the rectilinear state in the walking motion; and
- outputting, to the user walking toward a destination, guiding information based on the corrected angular velocity information, wherein
- the method further comprises:
- dividing the image information into a plurality of blocks each having a first size;
- dividing each of the blocks into a plurality of sub-blocks each having a second size smaller than the first size;
- detecting an edge amount for every one of the sub-blocks;
- determining one of the sub-blocks providing a maximum edge amount in each of the blocks as a representative sub-block of the each of the blocks;
- calculating a motion vector of the determined representative sub-block, thereby calculating the motion vector of the subject; and
- calculating the motion vector of the representative sub-block at a calculation timing synchronized with a walking period of the user.

16. A non-transitory computer-readable storage medium storing computer-readable instructions that, when executed by a computer, cause the computer to perform a method for guiding a user using a portable terminal device comprising circuitry including at least a camera, sensors, and a memory, the method comprising:
- acquiring, from one of the sensors, angular velocity information regarding an angular velocity in movement of the computer;
- measuring an acceleration in the movement of the computer by the circuitry to acquire acceleration information;
- causing learning of a feature point of a pattern in a known walking motion of the user carrying the computer;
- comparing the angular velocity information acquired and the acceleration information acquired with the feature point of the pattern;
- deciding whether a user is in a rectilinear state in the walking motion based on the comparison;
- correcting the angular velocity information outputted from the one of the sensors in a case where it is decided that the user is in the rectilinear state in the walking motion; and
- outputting, to the user walking toward a destination, guiding information based on the corrected angular velocity information.

17. A method for guiding a user, the method comprising:
- acquiring, from one of sensors, angular velocity information regarding an angular velocity in movement of a portable terminal device, the portable terminal device comprising circuitry including at least a camera, the sensors, and a memory;
- measuring an acceleration in the movement of the portable terminal device by the circuitry to acquire acceleration information;
- capturing an image of a subject in surroundings by the camera during a time period in which the portable terminal device is moving, to acquire image information;
- calculating a motion vector of the subject based on the image information acquired by the camera;
- deciding a relative relation between a traveling direction by a walking motion of the user and an image-capturing direction of the camera in accordance with the angular velocity information acquired and the acceleration information acquired by the circuitry;
- deciding whether the user is in a rectilinear state in the walking motion in accordance with the calculated motion vector of the subject and the relative relation;
- correcting the angular velocity information outputted from the one of the sensors in response to the decision that the user is in the rectilinear state in the walking motion; and
- outputting, to the user walking toward a destination, guiding information based on the corrected angular velocity information, wherein
- the method further comprises:
- dividing the image information into a plurality of blocks each having a first size;
- dividing each of the blocks into a plurality of sub-blocks each having a second size smaller than the first size;
- detecting an edge amount for every one of the sub-blocks;
- determining one of the sub-blocks providing a maximum edge amount in each of the blocks as a representative sub-block of the each of the blocks;
- calculating a motion vector of the determined representative sub-block, thereby calculating the motion vector of the subject; and
- calculating the motion vector of the representative sub-block at a calculation timing synchronized with a walking period of the user.

18. A method for guiding a user, the method comprising:
- causing learning of a feature point of a pattern in a known walking motion of the user carrying a portable terminal device including circuitry having at least a camera, sensors, and a memory;
- acquiring, from one of the sensors, angular velocity information regarding an angular velocity in movement of the portable terminal device;
- measuring an acceleration in the movement of the portable terminal device by the circuitry to acquire acceleration information;
- comparing the angular velocity information acquired and the acceleration information acquired with the feature point of the pattern;
- deciding whether a user is in a rectilinear state in the walking motion based on the comparison;

correcting the angular velocity information outputted from the one of the sensors in response to the decision that the user is in the rectilinear state in the walking motion; and outputting, to the user walking toward a destination, guiding information based on the corrected angular velocity information.

19. A portable terminal device carried by a user comprising:

circuitry including at least a camera, sensors, and a memory, the circuitry configured to:

acquire, from one of the sensors, angular velocity information regarding an angular velocity in movement of the portable terminal device;

measure an acceleration in the movement of the portable terminal device to acquire acceleration information;

capture an image of a subject in surroundings during a time period in which the portable terminal device is moving, to acquire image information;

calculate a motion vector of the subject based on the image information;

decide a relative relation between a traveling direction by a walking motion of the user and an image-capturing direction of the camera in accordance with the angular velocity information and the acceleration information acquired;

decide whether the user is in a rectilinear state in the walking motion in accordance with the motion vector of the subject calculated and the relative relation decided;

correct the angular velocity information outputted from the one of the sensors in response to the decision that the user is in the rectilinear state in the walking motion; and output, to the user walking toward a destination, guiding information based on the corrected angular velocity information, wherein the circuitry is further configured to:

divide the image information into a plurality of blocks each having a first size;

divide each of the blocks into a plurality of sub-blocks each having a second size smaller than the first size;

detect an edge amount for every one of the sub-blocks;

determine one of the sub-blocks providing a maximum edge amount in each of the blocks as a representative sub-block of the each of the blocks;

calculate a motion vector of the determined representative sub-block, thereby calculating the motion vector of the subject; and average the motion vector of the representative sub-block in every walking period of the user to obtain the motion vector of the subject.

20. The portable terminal device according to claim 19, wherein the walking period is determined in accordance with a time in which the user puts each of right and left feet by one step in the walking motion of the user.

* * * * *